United States Patent
Kanaya

(10) Patent No.: US 9,674,389 B2
(45) Date of Patent: *Jun. 6, 2017

(54) IMAGE UNIT WITH GUIDE UNIT MOVABLE IN DIRECTION PERPENDICULAR TO CONVEYANCE PATH

(71) Applicant: PFU LIMITED, Kahoku-shi, Ishikawa (JP)

(72) Inventor: Shingo Kanaya, Kahoku (JP)

(73) Assignee: PFU Limited, Ishikawa (JP)

( * ) Notice: Subject to any disclaimer, the term of this patent is extended or adjusted under 35 U.S.C. 154(b) by 12 days.

This patent is subject to a terminal disclaimer.

(21) Appl. No.: 13/916,452

(22) Filed: Jun. 12, 2013

(65) Prior Publication Data

US 2014/0079460 A1 Mar. 20, 2014

(30) Foreign Application Priority Data

Sep. 14, 2012 (JP) .................................. 2012-203167

(51) Int. Cl.
*H04N 1/04* (2006.01)
*H04N 1/203* (2006.01)
(Continued)

(52) U.S. Cl.
CPC ........... *H04N 1/2032* (2013.01); *B65H 3/063* (2013.01); *B65H 3/0653* (2013.01); *B65H 5/062* (2013.01);
(Continued)

(58) Field of Classification Search
USPC ................................. 358/496, 498, 408, 483
See application file for complete search history.

(56) References Cited

U.S. PATENT DOCUMENTS 7,777,920 B2 8/2010 Shoda et al.
7,872,783 B2 1/2011 Kitagawa et al.
(Continued)

FOREIGN PATENT DOCUMENTS

JP 5-193786 8/1993
JP 6-9106 1/1994
(Continued)

OTHER PUBLICATIONS

Office action mailed Jul. 13, 2015 in corresponding CN Patent Application No. 201310404104.4, including English translation, 13 pp.
(Continued)

*Primary Examiner* — Daniel J Colilla
(74) *Attorney, Agent, or Firm* — Lewis Roca Rothgerber Christie LLP

(57) ABSTRACT

A medium conveyance apparatus including a first unit on one side of a conveyance path of a sheet-shaped medium, a second unit on the other side of the conveyance path and facing the first unit, a guide unit that is provided at the second unit and that contacts the medium between the first and second unit to move the second unit in a direction of separating from the conveyance path, an imaging unit provided at one of the first and second unit, a reference plate whose image can be captured by the imaging unit and that is provided at the other of the first and second unit, and a detecting unit for detecting the medium in the conveyance path, the detecting unit being provided in the conveyance path at an upstream position of a reading position where the imaging unit reads the medium.

4 Claims, 23 Drawing Sheets

(51) Int. Cl.
*B65H 5/36* (2006.01)
*B65H 7/06* (2006.01)
*H04N 1/00* (2006.01)
*B65H 7/14* (2006.01)
*B65H 31/02* (2006.01)
*B65H 3/06* (2006.01)
*B65H 5/06* (2006.01)
*B65H 7/12* (2006.01)

(52) U.S. Cl.
CPC ............ *B65H 7/125* (2013.01); *B65H 7/14* (2013.01); *B65H 31/02* (2013.01); *H04N 1/00045* (2013.01); *H04N 1/00615* (2013.01); *H04N 1/00716* (2013.01); *H04N 1/04* (2013.01); *B65H 2301/1421* (2013.01); *B65H 2402/46* (2013.01); *B65H 2405/1117* (2013.01); *B65H 2405/324* (2013.01); *B65H 2511/13* (2013.01); *B65H 2511/51* (2013.01); *B65H 2515/60* (2013.01); *B65H 2553/30* (2013.01); *B65H 2553/45* (2013.01)

(56) References Cited

U.S. PATENT DOCUMENTS

| | | | |
|---|---|---|---|
| 8,462,185 | B2 | 6/2013 | Iguchi et al. |
| 8,675,258 | B2 | 3/2014 | Ikeda |
| 8,705,150 | B2 * | 4/2014 | Shirai et al. ................ 358/498 |
| 2005/0254103 | A1 | 11/2005 | Sugiyama et al. |
| 2006/0193015 | A1 * | 8/2006 | Machida ...................... 358/474 |
| 2007/0223062 | A1 * | 9/2007 | Tanaka et al. ............... 358/497 |
| 2007/0285730 | A1 * | 12/2007 | Suzuki ............ H04N 1/00031 358/3.24 |
| 2009/0231643 | A1 * | 9/2009 | Tan et al. ..................... 358/498 |
| 2010/0073742 | A1 * | 3/2010 | Tan ............................... 358/498 |
| 2011/0279840 | A1 | 11/2011 | Iwayama |
| 2013/0003145 | A1 * | 1/2013 | Osakabe et al. ............. 358/497 |

FOREIGN PATENT DOCUMENTS

| | | |
|---|---|---|
| JP | 08259032 A * 10/1996 | ............ B65H 5/06 |
| JP | 9-325535 | 12/1997 |
| JP | 2003-137457 | 5/2003 |
| JP | 2005-328216 | 11/2005 |
| JP | 2011-239273 | 11/2011 |

OTHER PUBLICATIONS

Office action mailed on Aug. 25, 2015 in corresponding Japanese Patent Application No. 2012-203167, including English translation, 5pp.
CN Office action dated Apr. 8, 2016 for corresponding CN Application No. 201310404104.4, including Engl. Translation, 16pp.
Office action mailed Aug. 19, 2016 in corresponding Chinese Patent Application No. 201310404104.4 including English translation, 15pp.

* cited by examiner

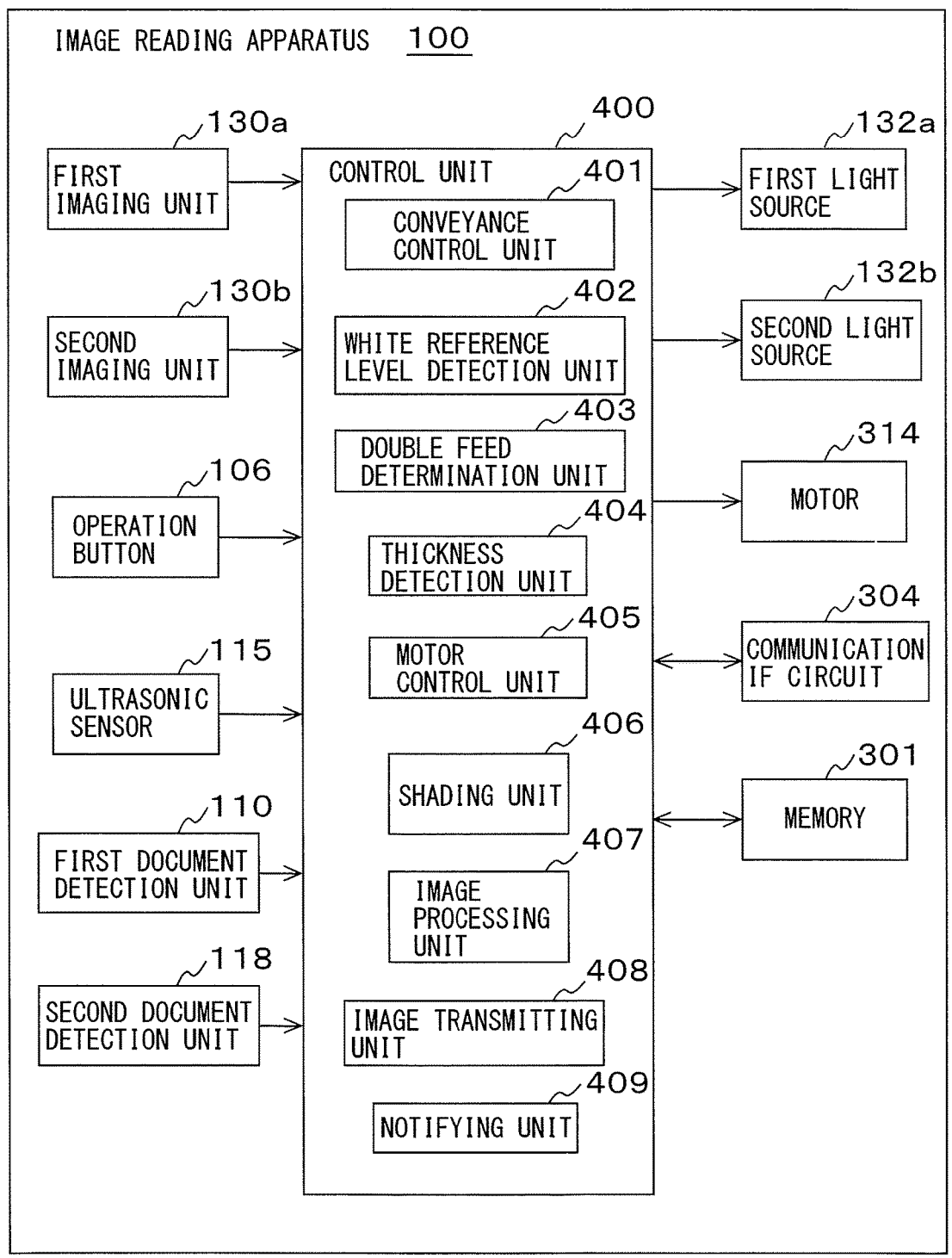

| OUTPUT OF ULTRASONIC SENSOR Lus | STATE | WHITE REFERENCE LEVEL DIFFERENCE DL |
|---|---|---|
| Lus>Th2 | THIN MEDIUM DOUBLE FEED DOES NOT OCCUR | — |
| Th2≧Lus>Th1 | THICK MEDIUM DOUBLE FEED DOES NOT OCCUR | DL>Th3 |
| | DOUBLE FEED OCCURS | Th3≧DL |
| Th1≧Lus | | |

IMAGE UNIT WITH GUIDE UNIT MOVABLE IN DIRECTION PERPENDICULAR TO CONVEYANCE PATH

CROSS-REFERENCE TO RELATED APPLICATIONS

This application is based upon and claims the benefit of priority of prior Japanese Patent Application No. 2012-203167, filed on Sep. 14, 2012, the entire contents of which are incorporated herein by reference.

TECHNICAL FIELD

Embodiments illustrated herein relate to a medium conveyance apparatus, and particularly to a medium conveyance apparatus for conveying a sheet-shaped document.

BACKGROUND

An ultrasonic double-sheet detecting method is known to detect a conveyance of a plurality of paper sheets in which the paper sheets overlap each other. In the ultrasonic double-sheet detecting method, a threshold common to all paper sheets is calculated in advance, the threshold is automatically set in a detected-wave high-level setting circuit of a controller at the time of the start of a paper feeding unit, and the threshold is used to determine whether the number of paper sheets from the paper feeding unit is two or not.

Further, a double feed detecting circuit including a white reference storage unit and a reference value correcting unit is known. The white reference storage unit stores paper-sheet-penetration light amount value information that is measured by a sensor in a state where there is no paper sheet, the sensor being provided on a conveyance path for conveying a paper sheet. The reference value correcting unit calculates a reference value used in an electric signal converting process at the time of conveying a paper sheet. The reference value correcting unit compares white reference information from the white reference storage unit, with the paper-sheet-penetration light amount value information depending on a paper sheet thickness of a document to perform calculation. Thereby, the reference value correcting unit obtains a calculation result as a white reference change amount to correct an analogue-to-digital (A/D) conversion reference value. On the basis of the corrected A/D conversion reference value, an A/D conversion unit converts a penetration light amount measured value of a conveyed document into an electrical signal to be output as paper sheet thickness value information. A conveyance controller compares the paper sheet thickness value information with the double feed value information stored in a paper sheet thickness storage unit to perform calculation. Thereby, the conveyance controller detects the double feed of documents.

Furthermore, it is known that a paper-type detection unit that detects a paper-type of a document, and a paper thickness detection unit that detects a paper thickness are arranged between a separation unit and a conveyance roller. Both of the units detect a reflected light amount and a penetrated light amount. Information from two sensors is treated as reference data that is a penetrated light amount from the paper thickness detection unit corresponding to a reflected light amount from a paper-type detection unit. The double feed of documents is determined by the comparison of the information from the two sensors with the recorded reference data.

Related art is disclosed in Japanese Laid-open Patent Publications No. 05-193786, No. 06-9106 and No. 2003-137457.

SUMMARY

In a medium conveyance apparatus, it may be preferable to detect a thickness of a document in the process of transfer.

For example, when an ultrasonic sensor is used to detect whether a single document is transferred or double feed occurs, not only the number of documents but also a thickness of a document changes an output level of the ultrasonic sensor. Accordingly, for example, when a thick document such as a card is transferred, it can be erroneously detected that double feed of thin paper documents occurs. In such a case, if a thickness of a document is obtained, transfer of a thick document can be distinguished from double feed of thin documents.

Meanwhile, a medium conveyance apparatus and an imaging apparatus are provided at the same device in some cases. For example, a document copier or a document reading device includes a medium conveyance apparatus that transfers a document or a copy paper sheet, and an imaging apparatus that captures an image of a document.

An object of the an apparatus illustrated herein is to realize a configuration in which a difference in a thickness of a medium in the process of transfer changes an image signal output from an imaging apparatus provided at a medium conveyance apparatus.

In accordance with an aspect of the embodiment, there is provided a medium conveyance apparatus including a first unit fixed on one side of a conveyance path of a sheet-shaped medium, a second unit provided on the other side of the conveyance path and facing the first unit, a guide unit that is provided at the second unit and that contacts the medium inserted into a gap between the first unit and the second unit to move the second unit in a direction of separating from the conveyance path, an imaging unit provided at one of the first unit and the second unit, a reference plate whose image can be captured by the imaging unit and that is provided at the other of the first unit and the second unit, and a detecting unit for detecting the medium conveyed in the conveyance path, the detecting unit being provided in the conveyance path at an upstream position of a reading position where the imaging unit reads the medium.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 illustrates one example of a functional configuration of the image reading apparatus 100.

DESCRIPTION OF EMBODIMENTS

Figure 1:
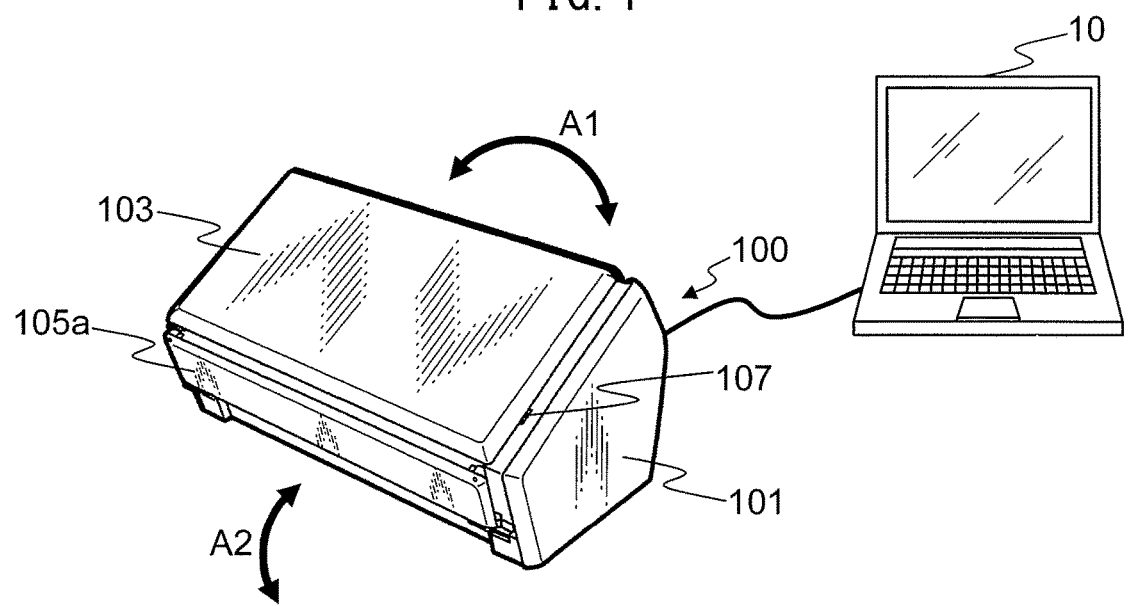
FIG. 1 illustrates one example of a configuration of an image processing system.

In the following, an image reading apparatus and an image processing system according to one aspect of the present invention will be described with reference to the attached drawings. FIG. 1 illustrates one example of a configuration of the image processing system. It is to be noted, however, that, the technical scope of the present invention is not limited to the embodiments of implementation of the invention, but covers the invention described in the claims and the equivalent of the invention.

The image reading apparatus of a present embodied example is configured as an image reading apparatus 100 such as an image scanner. The image processing system 1 includes the image reading apparatus 100 and an information processing apparatus 10. In FIG. 1, the image reading apparatus 100 is depicted by a perspective illustration. The image reading apparatus 100 includes a lower housing 101, an upper housing 102, a document table 103, a front surface cover 105a, an opening/closing detection unit 107, and the like. The image reading apparatus 100 is connected to the information processing apparatus 10. The image processing apparatus 10 is a personal computer, or a personal digital assistant, for example.

Figure 2:
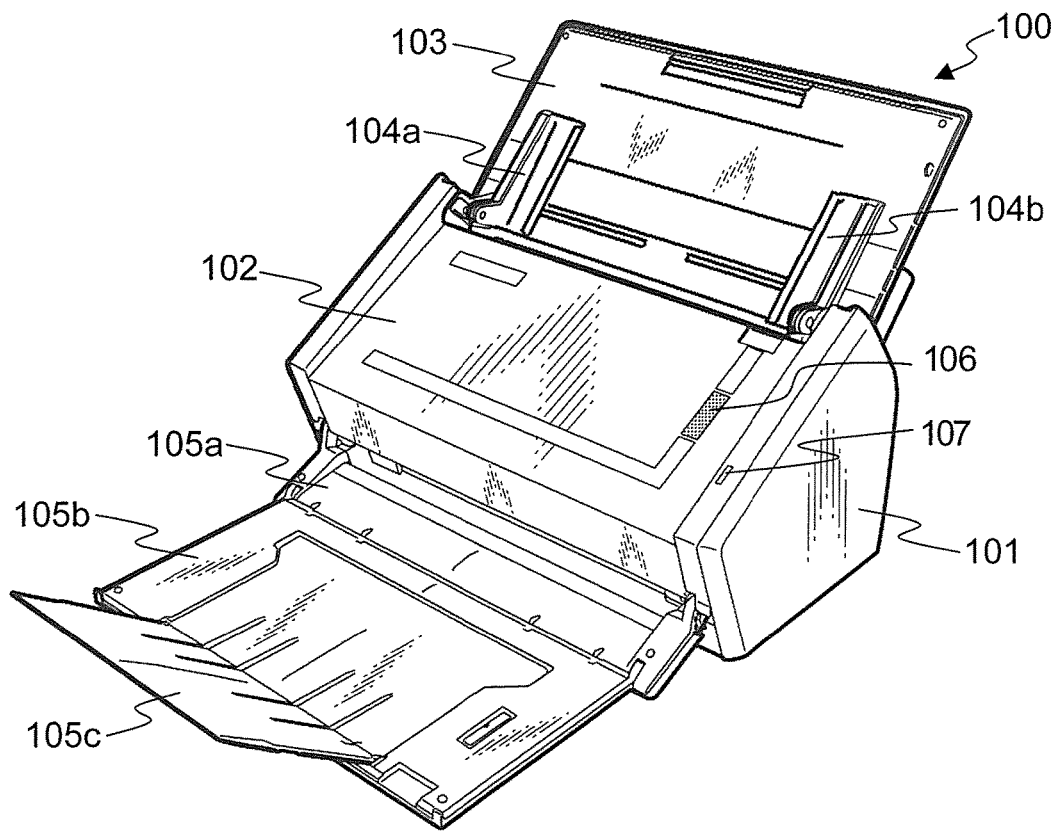
FIG. 2 is a perspective view of an image reading apparatus 100 in a state where a document table 103 is set.

Moreover, FIG. 2 is a perspective view of the image reading apparatus 100 where the document table 103 is set. The image reading apparatus 100 includes an upper surface cover 105b, an auxiliary cover 105c, and operation button 106. The document table 103 engages the lower casing 101 by hinges so as to be rotated in the direction indicated by the arrow A1. In a state of FIG. 1, the document table 103 is arranged at a position where the document table 103 covers the upper case 102, the upper surface cover 105b, and the auxiliary cover 105c. Thus, the document table 103 functions as an exterior cover.

Meanwhile, in the state as depicted in FIG. 2, the document table 103 is arranged such that documents can be placed on the document table 103. Provided in the document table 103 are side guides 104a and 104b that are movable in the right and left directions of the conveyance direction of a document. The side guides 104a and 104b are aligned with a width of a document to restrict the document in the width direction of the document.

The front surface cover 105a engages the lower housing 101 by hinges so as to be rotated in the direction indicated by the arrow A2. The upper surface cover 105b is connected at one end to the front surface cover 105a, and is connected at the other end to the auxiliary cover 105c. When it is necessary, the auxiliary cover 105c is let out from the upper surface cover 105b to hold a document.

The operation button 106 is arranged on the surface of the upper housing 102, which button generates and outputs an operation detection signal by pressing down. The opening/closing detection unit 107 includes a contact detecting sensor arranged at a position that faces the document table 103 in a closed state, and detects an opened state and a closed state of the document table 103. The opening/closing detection unit 107 generates and outputs an opening/closing detection signal of which signal value changes by the state of the document table 103 whether it is open or closed.

Figure 3:
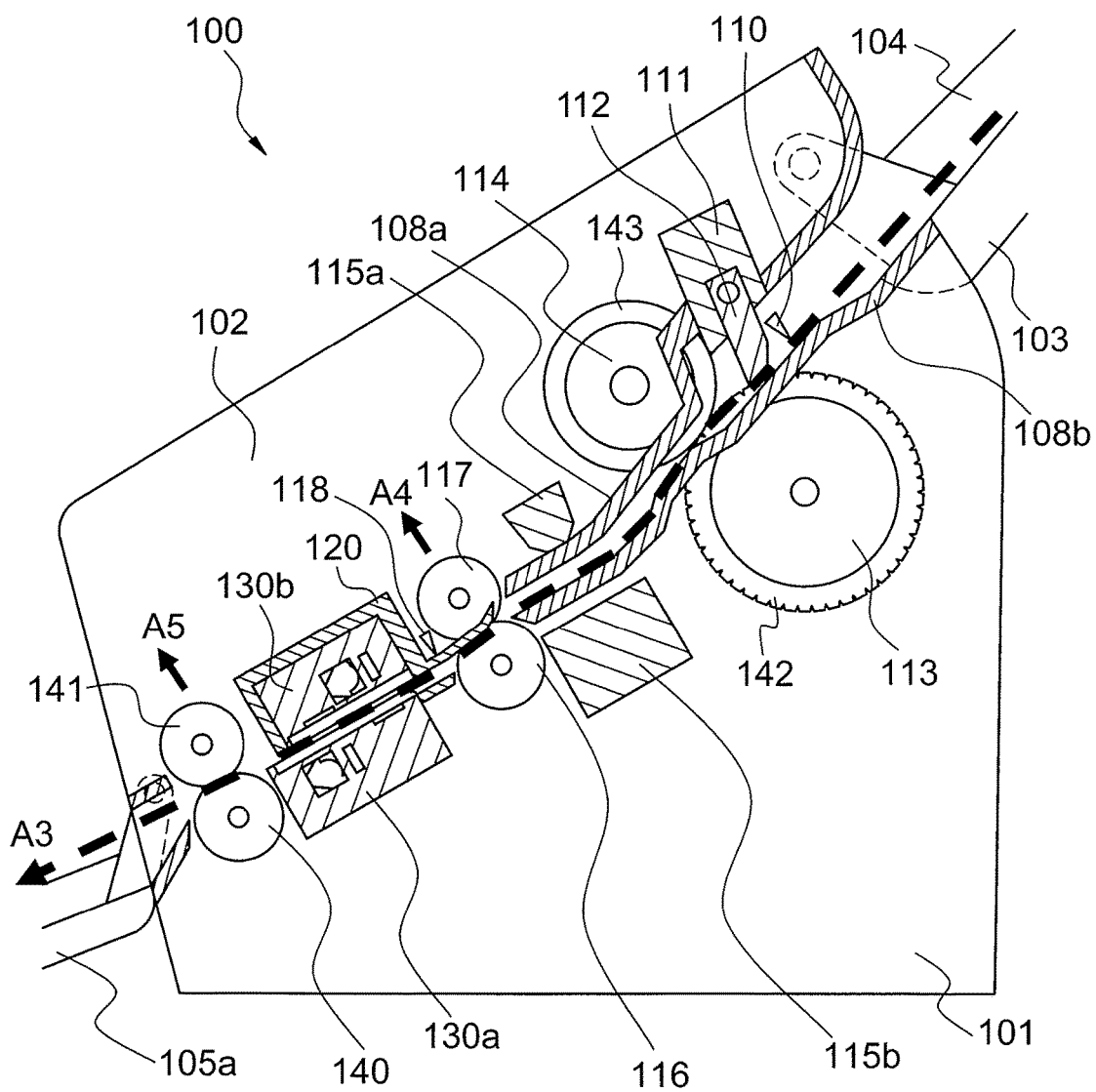
FIG. 3 illustrates a conveyance path inside the image reading apparatus 100.

FIG. 3 illustrates a conveyance path inside the image reading apparatus 100. The image reading apparatus 100 includes a first document detection unit 110, a pick arm 111, a flap 112, a sheet feeding roller 113, a retard roller 114, an ultrasonic wave transmitter 115a, an ultrasonic wave receiver 115b, a first conveyance roller 116, and a first driven roller 117. The image reading apparatus 100 includes a second document detection unit 118, an imaging unit guide 120, a first imaging unit 130a, a second imaging unit 130b, a second conveyance roller 140, a second driven roller 141, and the like.

A lower surface of the upper housing 102 forms an upper guide 108a of the document conveyance path, and an upper surface of the lower housing 101 forms a lower guide 108b of the document conveyance path. In FIG. 3, the arrow A3 indicates the conveyance direction of a document. In the following, the term "upstream" means "upstream in the conveyance direction A3", and the term "downstream" means "downstream in the conveyance direction A3.

The first document detection unit 110 includes a contact detecting sensor arranged in the upstream side of the pick arm 111, and detects whether or not a document is placed on the document table 103. The first document detection unit 110 generates and outputs a first document detection signal of which signal value changes by the state whether or not a document is placed on the document table 103.

The sheet feeding roller 113 is supported by a main body unit of the image reading apparatus in a rotation-free manner. Provided in an outer circumferential surface of the sheet feeding roller 113 is a contact material 142 that contacts a document placed on the document table 103. The contact material 142 is made of rubber, for example, of which coefficient of friction with a document is large.

The retard roller 114 is arranged to face the sheet feeding roller 113, and restricts so that a document that does not contact the sheet feeding roller 113 is not conveyed in the conveyance direction A3. The retard roller 114 is supported by the main body unit of the image reading apparatus in a rotation-free manner. Provided in an outer circumferential surface of the retard roller 114 is a contact material 143 that contacts a document placed on the document table 103. The contact material 143 is made of rubber, for example, of which coefficient of friction with a document is large.

The ultrasonic wave transmitter 115a and the ultrasonic wave receiver 115b are arranged near the document conveyance path so as to sandwich the conveyance path and face each other. The ultrasonic wave transmitter 115a transmits an ultrasonic wave. Meanwhile, the ultrasonic wave receiver 115b detects an ultrasonic wave that has been transmitted by the ultrasonic wave transmitter 115a and has penetrated a document, and generates and outputs an ultrasonic wave signal that is an electrical signal depending on the detected ultrasonic wave. In the following, the ultrasonic wave transmitter 115a and the ultrasonic wave receiver 115b may be collectively referred to as an ultrasonic sensor 115.

The first conveyance roller 116 and the first driven roller 117 are respectively supported by the main body unit of the image reading apparatus in a rotation-free manner. The first conveyance roller 116 and the first driven roller 117 are arranged on the upstream side of the first imaging unit 130a and the second imaging unit 130b. The first driven roller 117 is arranged above the first conveyance roller 116 to face the first conveyance roller 116. The first conveyance roller 116 is fixed, and the first driven roller 117 is arranged so as to be movable upward (in the direction of the arrow A4) relative to the first conveyance roller 116.

The second conveyance roller 140 and the second driven roller 141 are respectively supported by the main body unit of the image reading apparatus in a rotation-free manner. The second conveyance roller 140 and the second driven roller 141 are arranged on the downstream side of an imaging unit 130. The second driven roller 141 is arranged above the second conveyance roller 140 to face the second conveyance roller 140. The second conveyance roller 140 is fixed, and the second driven roller 141 is arranged so as to be movable upward (in the direction of the arrow A5) relative to the second conveyance roller 140.

Figure 4:
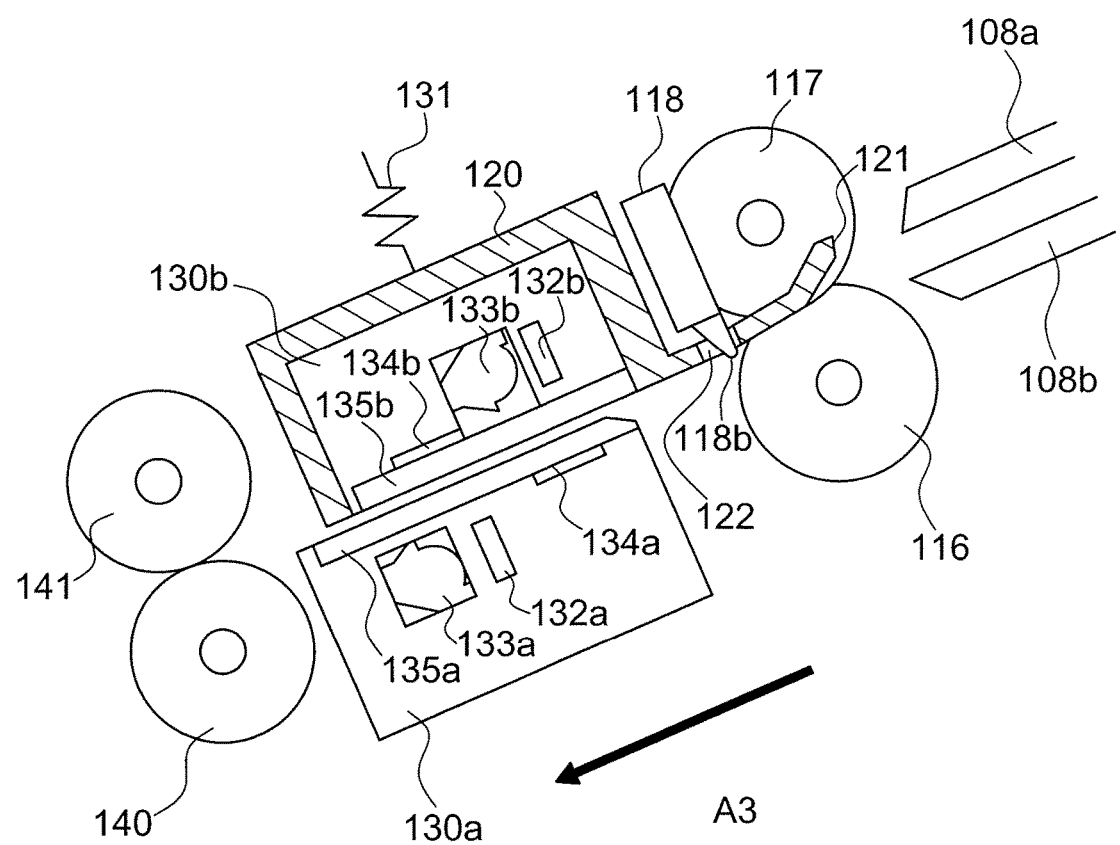
FIG. 4 illustrates a first imaging unit 130a, a second imaging unit 130b, and an imaging unit guide 120.

FIG. 4 illustrates the first imaging unit 130a, the second imaging unit 130b, and the imaging unit guide 120. The first imaging unit 130a captures an image of a front surface of a conveyed document, and the second imaging unit 130b captures an image of a back surface of the conveyed document. The second imaging unit 130b is arranged above the first imaging unit 130a to face the first imaging unit 130a. The second imaging unit 130b includes the imaging unit guide 120 for guiding a document between the first imaging unit 130a and the second imaging unit 130b. In the following, the first imaging unit 130a and the second imaging unit 130b may be collectively referred to as the imaging unit 130.

The first imaging unit 130a is fixed to the lower housing 101. Meanwhile, the second imaging unit 130b is supported by the upper housing 102 so as to be movable in the direction perpendicular to the conveyance path. The second imaging unit 130b includes a pushing spring 131 at an upper position thereof. The pushing spring 131 pushes the second imaging unit 130b toward the first imaging unit 130a. When there is no document at the conveyance path, pushing force of the pushing spring 131 returns the second imaging unit 130b back to an initial position.

When the second imaging unit 130b is at the initial position, a width of a gap between the first imaging unit 130a and the second imaging unit 130b facing each other is larger than the thicknesses of a copy paper sheet, a print paper sheet, a photo paper sheet, and the like. For this reason, the second imaging unit 130b does not move from the initial position after any of these sheets are conveyed.

The first imaging unit 130a includes a first light source 132a, a first image sensor 133a, a first white reference unit 134a, a first glass surface 135a, and the like. The second imaging unit 130b includes a second light source 132b, a second image sensor 133b, a second white reference unit 134b, a glass surface 135b, and the like. In the following, the first image sensor 133a and the second image sensor 133b may be collectively referred to as an image sensor 133. The first white reference unit 134a and the second white reference unit 134b may be collectively referred to as a white reference unit 134.

The first light source 132a includes light emitting diodes (LEDs) of respective colors RGB and a light guiding material, and emits an illuminating light to a document surface. When there is no document at an illuminating position, the second white reference unit 134b of the second imaging unit 130b is irradiated with illuminating light. Similarly, the second light source 132b includes LEDs of respective colors RGB and a light guiding material, and emits an illuminating light to a document surface. When there is no document at an illuminating position, the first white reference unit 134a of the first imaging unit 130a is irradiated with illuminating light.

The image sensor 133 is a contact image sensor (CIS) that is a unit-magnification optical system that includes an imaging element constituted by charge coupled devices (CCDs) that are linearly arranged in a main scanning direction. The image sensor 133 reads a surface of a document to generate and output an image signal. Alternatively, instead of the CCDs, complementary metal oxide semiconductors (CMOSs) may be used. Further, alternatively, instead of the CIS, an image sensor that is an optical reduction system can be used.

The first white reference unit 134a is arranged at a position facing the second image sensor 133b of the second imaging unit 130b. When a document is not conveyed to the imaging unit 130, the second image sensor 133b captures an image of the first white reference unit 134a to generate an image signal. Similarly, the second white reference unit 134b is arranged at a position facing the first image sensor 133a of the first imaging unit 130a. When a document is not conveyed to the imaging unit 130, the first image sensor 133a captures an image of the second white reference unit 134b to generate an image signal. On the basis of the image signals generated by capturing the images of the first white reference unit 134a and the second white reference unit 134b, the image reading apparatus can perform image correction such as shading, and the like.

Provided at the imaging unit guide 120 is a guide member 121 that guides a document to a position between the first imaging unit 130a and the second imaging unit 130b. Provided above the guide member 121 is a contact detecting sensor included in the second document detection unit 118. A lever unit 118b of the contact detecting sensor penetrates a penetration hole 122 provided in the guide member 121 to contact a document on the conveyance path.

Figure 5:
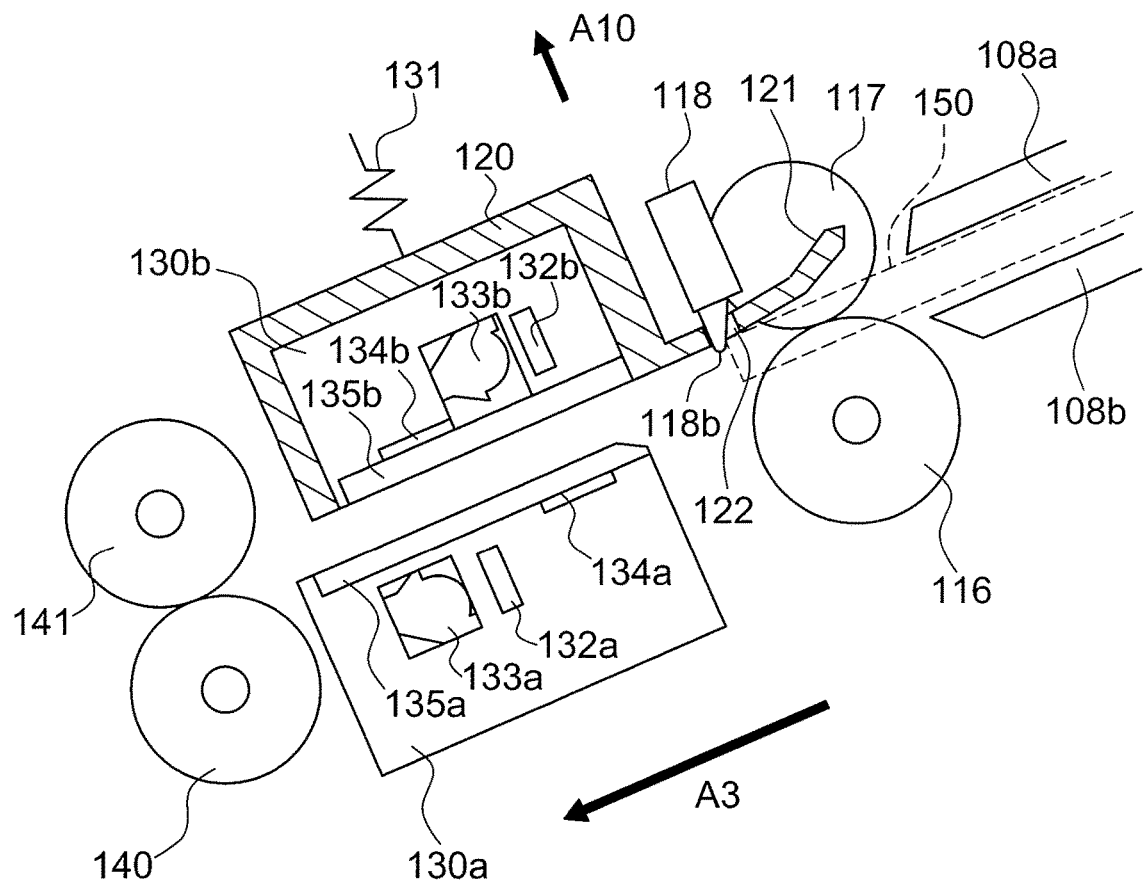
FIG. 5 illustrates operation of the second imaging unit 130b at the time of conveying a document.

FIG. 5 illustrates an operation of the second imaging unit 130b at the time of conveying a document. It is assumed that a thick medium such as a cardboard, a banking card, and a credit card is conveyed as a document 150. A thickness of the medium is larger than thicknesses of a copy paper sheet, a print paper sheet, and a photo paper sheet.

In the following description, a relatively thick medium such as cardboard, a banking card, and a credit card is referred to as a thick medium. Meanwhile, a relatively thin medium such as a thin paper sheet is referred to as a thin medium. A medium that is thicker than a thin medium and thinner than a thick medium and that has a thickness of a copy paper sheet, a print paper sheet, a photo paper sheet, or the like is referred to as an intermediate-thickness medium.

When a document 150 that is a thick medium is conveyed to a position of the imaging unit guide 120, the document 150 having a certain degree of strength contacts the guide member 121, and the imaging unit guide 120 and the second imaging unit 130b move in the direction of the arrow A10, separating from the conveyance path. On the other hand, even when a document 150 that is a thin medium or an intermediate-thickness medium is conveyed to the imaging unit guide 120, the second imaging unit 130b does not moved from the initial position. Thereby, in case that a document that is a thick medium is conveyed, a gap between the first imaging unit 130a and the second imaging unit 130b is widened, compared with a case of a document that is a thin medium or an intermediate-thickness medium being conveyed.

A fluctuation in a gap between the first imaging unit 130a and the second imaging unit 130b changes brightness of an image of the white reference unit 134 captured by the image sensor 133. Accordingly, on the basis of a difference of a change of images of the white reference unit 134 before and after a document 150 moves the second imaging unit 130b, a thickness of the document 150 can be detected.

A document 150 that contacted the guide member 121 then contacts the lever unit 118b of the second document detection unit 118 that penetrates the penetration hole 122 of the guide member 121. Thereby, the second document detection unit 118 detects that the document 150 exists at a position of the lever unit 118b. The second document detection unit 118 generates and outputs a second document detection signal that has a first value in a state where the lever unit 118b does not contact a document 150, and that has a second value in a state where the lever unit 118b contacts a document 150.

The lever unit 118b is provided at a position where the lever unit 118b detects a leading end of a document 150 when the document 150 that is a thick medium moves the second imaging unit 130b in the direction A10 by a movement amount corresponding to a thickness of the document 150. Moreover, for detecting a thickness of a document 150, an image of the first white reference unit 134a or the second white reference unit 134b is used, such an image being captured after a leading end of the document 150 is detected. For this reason, the lever unit 118 is positioned such that a leading end of a document 150 is detected on the upstream side of at least one of image capturing positions of the first image sensor 133a and the second image sensor 133b.

Figure 6:
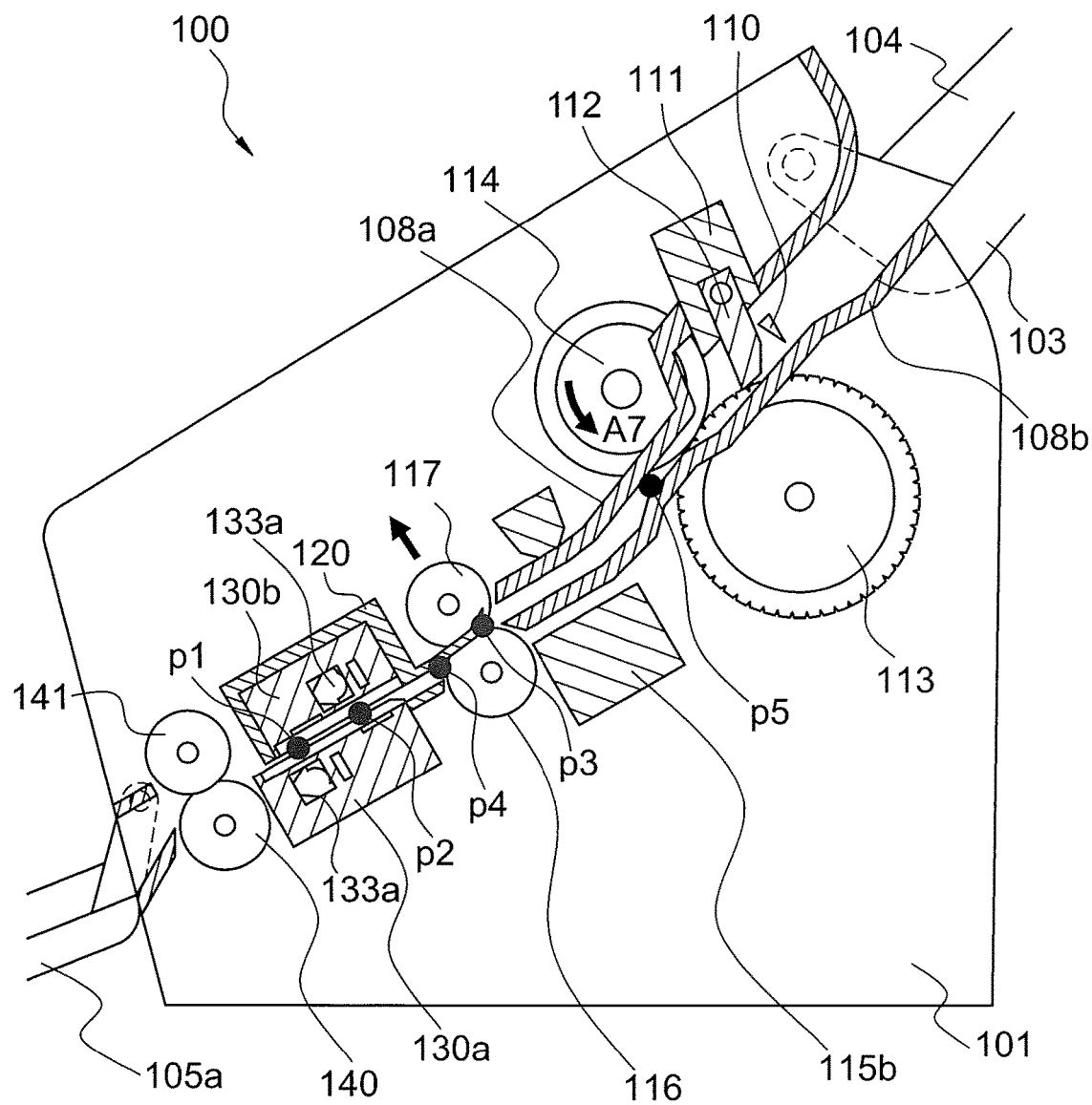
FIG. 6 illustrates candidates for an arrangement position of the second document detection unit 118.

FIG. 6 illustrates candidates for an arrangement position of the second document detection unit 118. As described above, the second document detection unit 118 is positioned such that a leading end of a document is detected on the upstream side of at least one of the image capturing position p1 of the first image sensor 133a and the image capturing position p2 of the second image sensor 133b. Moreover, to detect a document after the second imaging unit 130b is moved, the second document detection unit 118 is positioned such that a leading end of a document is detected on the downstream side of a front end position p3 of an upstream side of the imaging unit guide 120.

Moreover, if a leading end of a document is at a downstream position of any of the rollers conveying a document provided at an upstream side of the imaging unit 130, it is possible to determine how far the document is to be transferred from this position so that the second imaging unit 130b is moved by an amount corresponding to the thickness of the document that is a thick medium. Accordingly, the second document detection unit 118 may be positioned such that a leading end of a document is detected on the downstream side of at least one of a position p4 on the downstream side of the first conveyance roller 116, and a position p5 on the downstream side of the sheet feeding roller 113.

In the above-described embodied example, the second imaging unit 130b provided above the conveyance path is configured to move by a document 150 that is a thick medium. Alternatively, the first imaging unit 130a provided below the conveyance path may be configured to move by a document 150 that is a thick medium.

Figure 7:
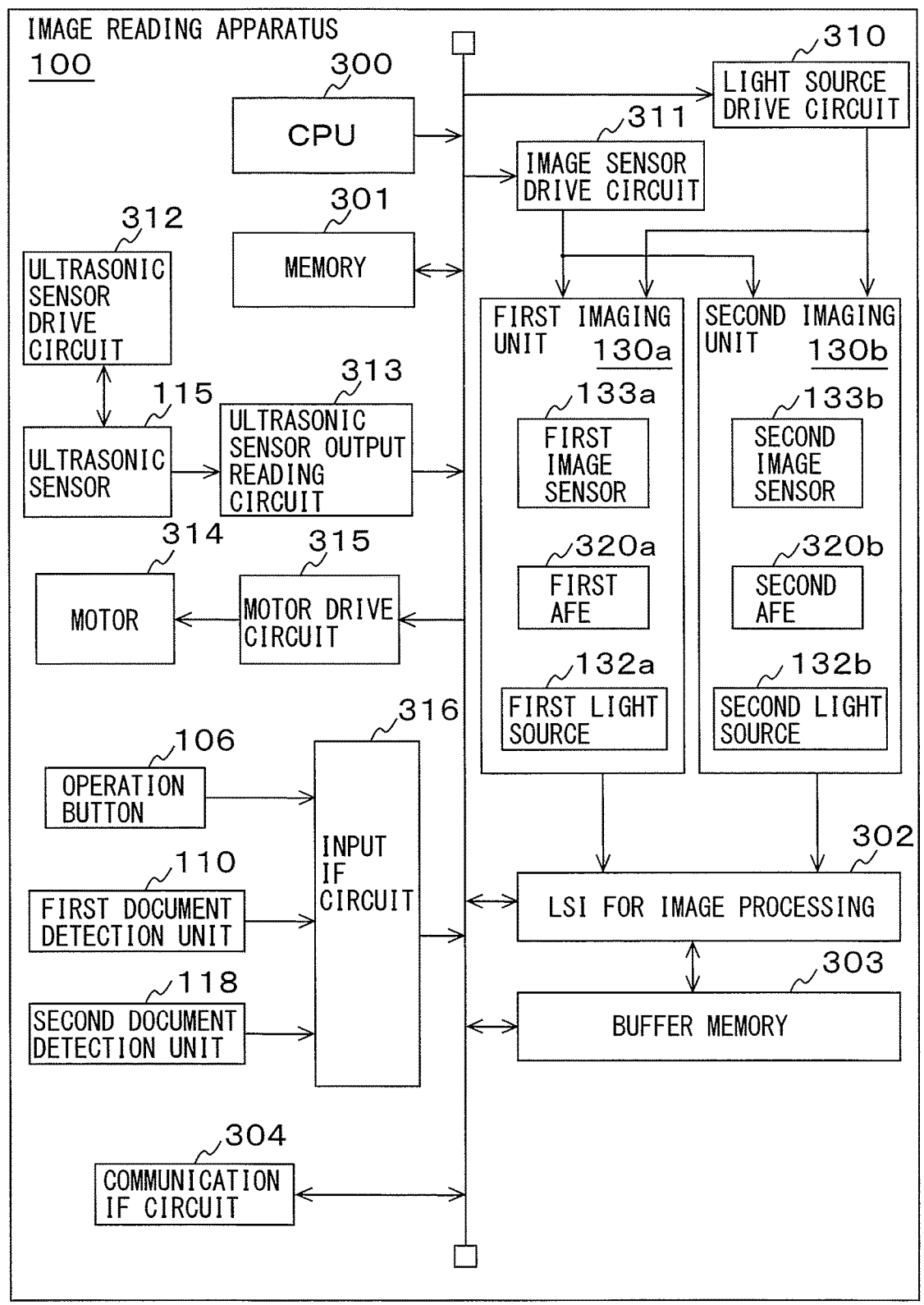
FIG. 7 illustrates one example of a hardware configuration of the image reading apparatus 100.

FIG. 7 illustrates one example of a hardware configuration of the image reading apparatus 100. The image reading apparatus 100 includes a central processing unit (CPU) 300, a memory 301, a large scale integration (LSI) 302 for image processing, a buffer memory 303, and a communication interface circuit 304 as well as the above-described configuration. In the attached drawings and the following description, an interface may be referred to as an IF.

Moreover, the image reading apparatus 100 includes a light source drive circuit 310, an image sensor drive circuit 311, an ultrasonic sensor drive circuit 312, an ultrasonic sensor output reading circuit 313, a motor 314, a motor drive circuit 315, and an input IF circuit 316. The first imaging unit 130a and the second imaging unit 130b include a first analogue front-end processor (AFE) 320a and a second AFE 320b, respectively.

The CPU 300 controls an operation of the image reading apparatus 100 in accordance with a computer program stored in the memory 301. In some embodied example, the CPU 300 may perform a part of or all of image processing for an image read by the image reading apparatus 100. Stored in the memory 301 are the computer program executed by the CPU 300, and the data used in executing the computer program. The memory 301 may include a nonvolatile storage device for storing the program, and a volatile memory for temporarily storing the data.

The first AFE 320a and the second AFE 320b convert analogue image signals into digital signals to generate digital image data, the analogue image signals being output from the first image sensor 133a of the first imaging unit 130a and the second image sensor 133b of the second imaging unit 130b. The first AFE 320a and the second AFE 320b output the image data to the LSI 320 for image processing.

The LSI 302 for image processing performs a shading process and predetermined image processing on the image data received from the imaging unit 130. The LSI 302 for image processing stores such image data in the buffer memory 303 as the image processing is performed.

The communication IF circuit 304 is a wired or wireless communication interface between the image reading apparatus 100 and the information processing apparatus 10. The CPU 300 reads the image date from the buffer memory 303 to transmit the image data to the information processing apparatus 10 via the communication IF circuit 304.

The light source drive circuit 310 drives the first light source 132a of the first imaging unit 130a and the second light source 132b of the second imaging unit 130b in accordance with the control performed by the CPU 300. The image sensor drive circuit 311 drives the first image sensor 133a of the first imaging unit 130a and the second image sensor 133b of the second imaging unit 130b in accordance with the control performed by the CPU 300.

The ultrasonic sensor drive circuit 312 drives the ultrasonic wave transmitter 115a to cause the ultrasonic wave to be transmitted. The ultrasonic sensor output reading circuit 313 reads an output signal of the ultrasonic wave receiver 115b to transmit the output signal to the CPU 300 via a bus.

The motor 314 gives rotational driving force to the sheet feeding roller 113, the retard roller 114, the first conveyance roller 116, and the second conveyance roller 140. A plurality of the motors 314 may be provided. In accordance with the control performed by the CPU 300, the motor drive circuit 315 generates a drive current that is supplied to the motor 314.

The input IF circuit 316 receives an operation detection signal output by the operation button 106, a first document detection signal output by the first document detection unit 110, and a second document detection signal output by the second document detection unit 118 to transmit the signals to the CPU 300 via the bus.

The hardware configuration illustrated in FIG. 7 is merely an example for explanation of the embodied example. The image reading apparatus 100 may include any other hardware configurations as long as the operation described in the following may be performed.

FIG. 8 illustrates one example of a functional configuration of the image reading apparatus 100. The image reading apparatus 100 includes a control unit 400. Moreover, the functional configuration diagram of FIG. 8 mainly represents a configuration related to the function of the image reading apparatus 100 that are described in the present specification. The image reading apparatus 100 may include the configuration elements other than the configuration elements represented in the drawing. Moreover, an operation of the control unit 400 is performed by cooperation of the CPU 300 and the LSI 302 for image processing in FIG. 7.

The control unit 400 includes a conveyance control unit 401, a white reference level detection unit 402, a double feed determination unit 403, a thickness detection unit 404, a motor control unit 405, a shading processing unit 406, an image processing unit 407, an image transmitting unit 408, and a notifying unit 409.

The conveyance control unit 401 controls a rotational operation of the motor 314 for conveying a document. The white reference level detection unit 402 detects a white reference level that indicates brightness of an image signal obtained by image capturing of the white reference unit 134, the image capturing being performed by the image sensor 133.

Figure 9A:
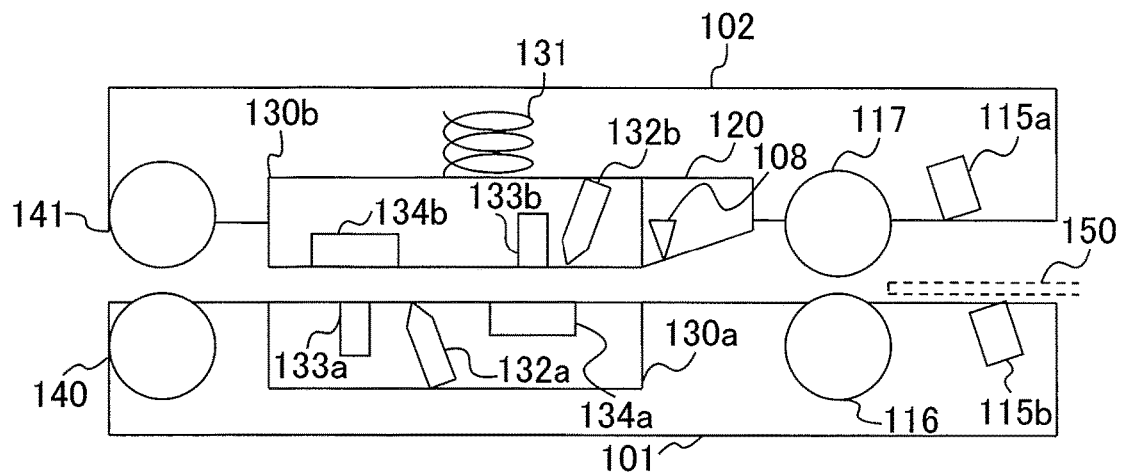
FIG. 9A illustrates detection of a first white reference level.

FIG. 9A illustrates a detection of a first white reference level. The white reference level detection unit 402 detects a first white reference level L1 before a document 150 reaches the position of the imaging unit guide 120 after a document conveyance is started.

Figure 9B:
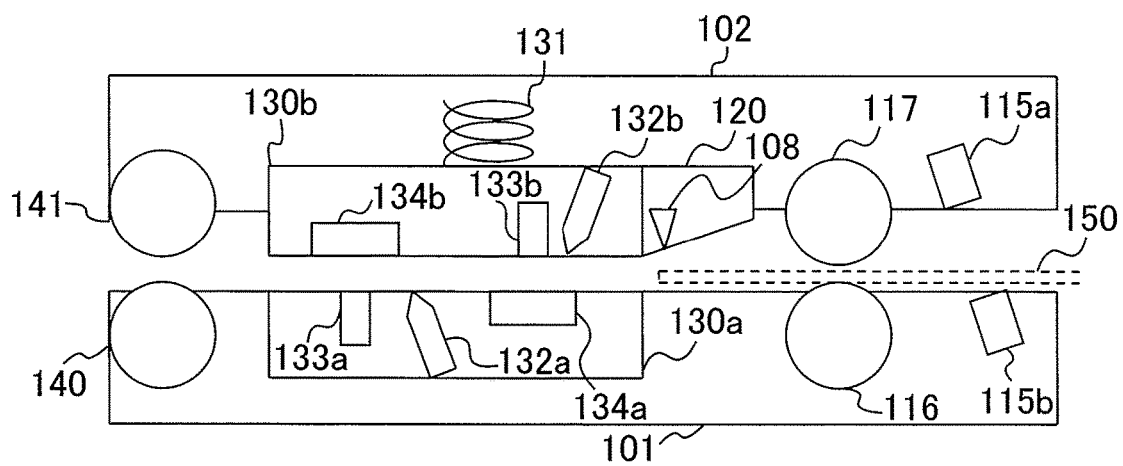
FIG. 9B illustrates detection of a second white reference level.
Figure 9C:
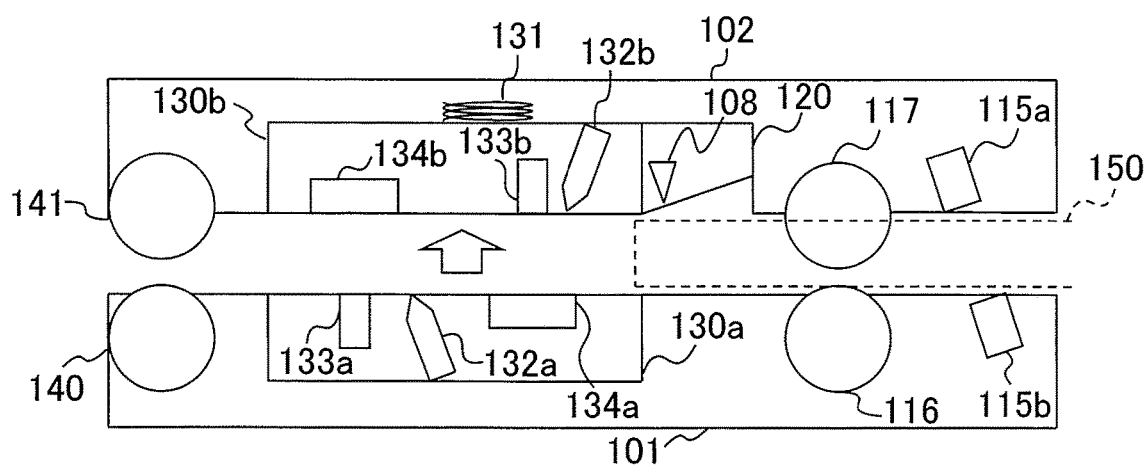
FIG. 9C illustrates detection of a second white reference level.

FIG. 9B and FIG. 9C illustrate a detection of a second white reference level. The conveyance control unit 401 stops the conveyance when a leading end of the document 150 to be conveyed is detected by the second document detection unit 118, and the value of a second document detection signal changes from the first value to the second value. In this state, the white reference level detection unit 402 detects a white reference level L2 for the second time.

FIG. 9B illustrates a state of detecting a white reference level L2 when a document 150 is a thin medium or an intermediate-thickness medium. In this case, a position of the second imaging unit 130b is maintained at the initial position. FIG. 9C illustrates a state of detecting a white reference level L2 when a document 150 is a thick medium. When a document 150 is a thick medium, the second imaging unit 130b moves in the direction of separating from the conveyance path. For this reason, a gap between the image sensor 133 and the white reference unit 134 becomes wider than a gap when a document 150 is a thin medium or an intermediate-thickness medium.

The double feed determination unit 403 performs a double feed determining process of determining whether or not a double feed occurred, in which a plurality of documents overlapping each other are conveyed. As illustrated in FIGS. 9A to 9C, while one or more documents exist between the ultrasonic wave transmitter 115a and the ultrasonic wave receiver 115b, the double feed determination unit 403 reads output Lus of the ultrasonic wave receiver 115b.

Figure 10A:
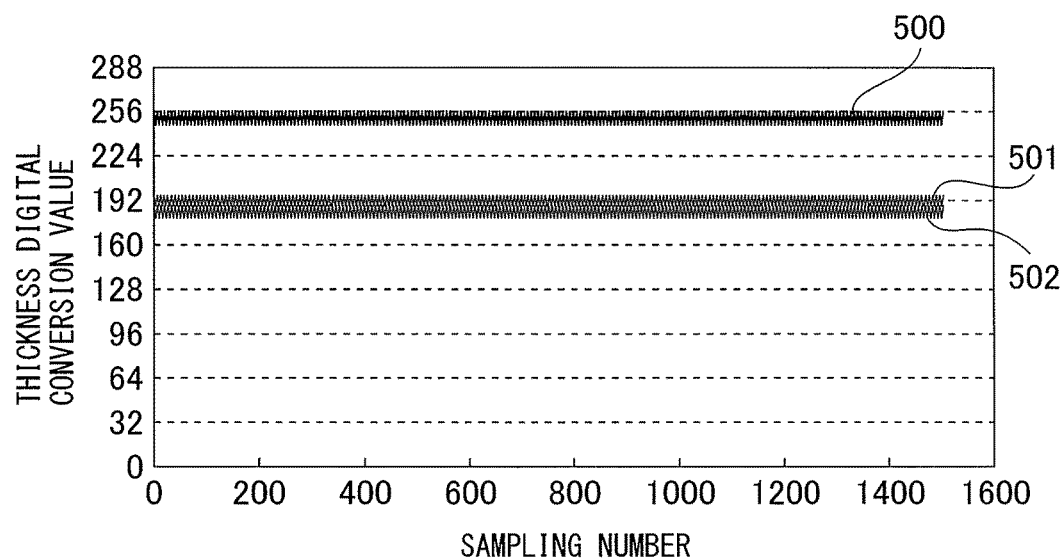
FIG. 10A represents examples of respective output of an ultrasonic sensor 115 when documents that are different media are conveyed.

FIG. 10A represents examples of respective output Lus of the ultrasonic sensor 115 when the documents of different media are conveyed. The horizontal axis indicates by which sampling a measured value is obtained, and the vertical axis indicates a digital value that is an index value of a document thickness converted from output Lus of the ultrasonic sensor 115. When a document is a thin medium, and a double feed does not occur, an output value 500 is stabilized at a value larger than a threshold "224". When output Lus of the ultrasonic sensor 115 is larger than this threshold, it can be determined that the double feed has not occurred.

Moreover, when a double feed of a document of an intermediate-thickness media occurs, output Lus is stabilized at a value equal to or smaller than a threshold "160". Accordingly, when output Lus of the ultrasonic sensor 115 is equal to or smaller than this threshold, it can be determined that a double feed has occurred.

When a document is a thick medium, and a double feed does not occur, an output value 501 possibly becomes a value close to an output value 502 when a double feed of documents that are thin media occurs. For this reason, in a double feed determination based on output Lus of the ultrasonic sensor 115, when a document is a thick medium, and a double feed does not occur, it can be erroneously determined that a double feed occurs. Further, when a double feed of a document of a thin media occurs, it can be erroneously determined that a document is a thick medium, and a double feed does not occur.

Figure 10B:
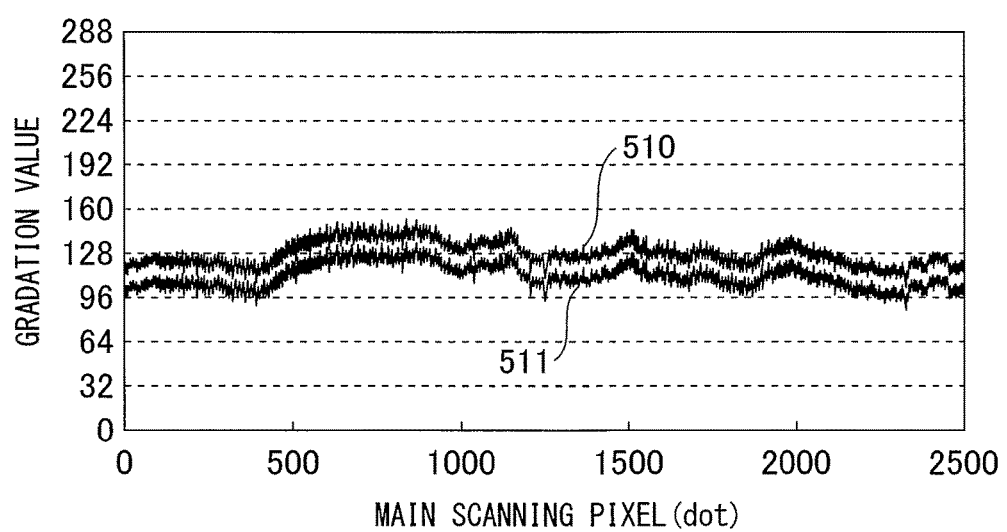
FIG. 10B illustrates change in a white reference level due to a difference in a thickness of a medium.

For this reason, the thickness detection unit 404 detects a thickness of a conveyed document on the basis of a white reference level difference DL=(L1−L2) that is a difference between a first white reference level L1 and a second white reference level L2. FIG. 10B illustrates a change of a second white reference level L2 due to a difference in a thickness of a medium. The horizontal axis indicates a pixel position in a main scanning direction when the image sensor 133 captures image of the white reference unit 134. The vertical axis indicates a gradation value, i.e., a brightness difference value of a white reference level.

In the case of a thin medium or an intermediate-thickness medium, a position of the second imaging unit 130b is maintained at the initial position. Accordingly, a second white reference level 510 for a thin medium or an intermediate-thickness medium is the same as a first white reference level L1. The brightness of a second white reference level 511 for a thick medium becomes smaller by widening of a gap between the image sensor 133 and the white reference unit 134. For this reason, a white reference level difference DL when a document is a thick medium becomes larger than a white reference level difference DL when a document is a thin medium or an intermediate-thickness medium.

In accordance with a result of a document thickness detection performed by the thickness detection unit 404, the double feed determination unit 403 determines whether or not a double feed of documents is occurring, when output Lus of the ultrasonic sensor 115 stays within a range of a value that is output when a document is a thick medium, and a double feed does not occur.

Figures 11, 12:
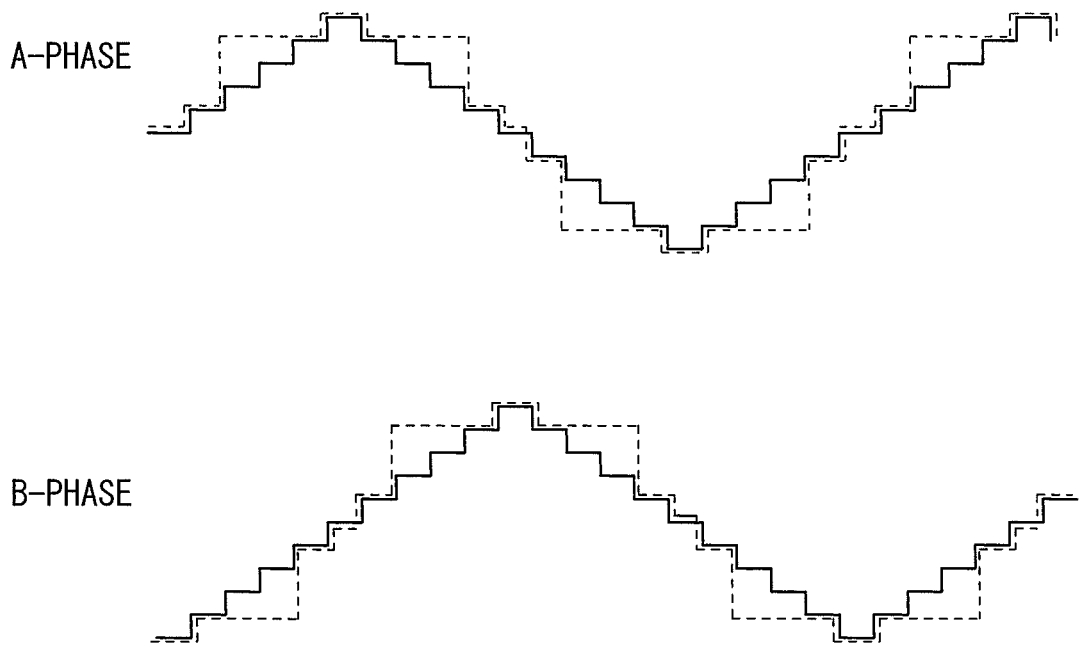
FIG. 11 illustrates one example of conditions for determining a double feed occurrence and a document thickness.
FIG. 12 schematically illustrates waveforms of an electric current that flows in A-phase coils and B-phase coils of a two-phase stepping motor.

FIG. 11 illustrates one example of the conditions for determining a double feed occurrence and a document thickness. When output Lus is equal to or smaller than a threshold Th1, the double feed determination unit 403 determines that a double feed has occurred. In the case of respective output examples of the ultrasonic sensor 115 of FIG. 10A, the threshold Th1 may be set at "160". When output Lus is larger than a threshold Th2, the double feed determination unit 403 determines that a document is a thin medium, and a double feed is not occurring. In the case of respective output examples of the ultrasonic sensor 115 of FIG. 10A, the threshold Th2 may be set at "224".

When output Lus is equal to or smaller than the threshold Th2, and is larger than the threshold Th1, the thickness detection unit 404 determines whether or not a document is a thick medium, on the basis of a white reference level difference DL being larger than a threshold Th3 or not. When the document is a thick medium, the double feed determination unit 403 determines that double feed is not occurring. When the document is not a thick medium, the double feed determination unit 403 determines that a double feed has occurred.

Reference is made to FIG. 8. In accordance with a result of a detection made by the thickness detection unit 404, the motor control unit 405 performs a motor torque adjusting process of changing a generating torque of the motor 314. If a document that is a thick medium is conveyed by the same torque as for a document that is not a thick medium, the motor 314 possibly loses steps. When a document is a thick medium, the motor control unit 405 causes a generating torque of the motor 314 to be larger than the case when a document is not a thick medium.

For example, the motor control unit 405 increases the maximum value of an electric current applied to the motor 314 to increase a generating torque of the motor 314. Alternatively, for example, the motor control unit 405 may change a method of exciting the motor 314 to increase a generating torque.

For example, the motor control unit 405 may change an exciting method from an one-phase exciting method to a two-phase exciting method to increase a drive electric current area of coils of the motor 314 per unit time without changing the maximum value of an electric current, and thereby, a generating torque may be increased. Also when the motor 314 is driven by a micro-step drive, the motor control unit 405 may change a drive electric current area of coils of the motor 314 per unit time without changing the maximum value of an electric current, and thereby, a generating torque of the motor 314 may be increased.

FIG. 12 schematically illustrates waveforms of an electric current that is made to flow in A-phase coils and B-phase coils when the motor 314 that is a two-phase stepping motor is driven by a micro-step drive. The waveforms of the solid lines are the waveforms of a drive electric current that is made to flow in the coils of the motor 314 when a document is not a thick medium, and the waveforms of the broken lines are waveforms of a drive electric current that is made to flow in the coils of the motor 314 when a document is a thick medium. As illustrated in FIG. 12, when a document is a thick medium, a generating torque of the motor 314 can be increased by increasing a drive electric current area per unit time to be larger than that when a document is not a thick medium.

Reference is made to FIG. 8. The shading processing unit 406 performs a shading processing of the data received from the imaging unit 130. On the basis of a brightness distribution of an image data of the second white reference unit 134b obtained by detecting a second white reference level L2, the shading processing unit 406 generates a shading correction data for a shading correction of a front-surface image data of a document 150 shot by the first imaging unit 130a. On the basis of a brightness distribution of an image data of the first white reference unit 134a obtained by detecting a second white reference level L2, the shading processing unit 406 generates a shading correction date for a shading correction of a back-surface image data of a document 150 shot by the second imaging unit 130b.

Figure 13A:
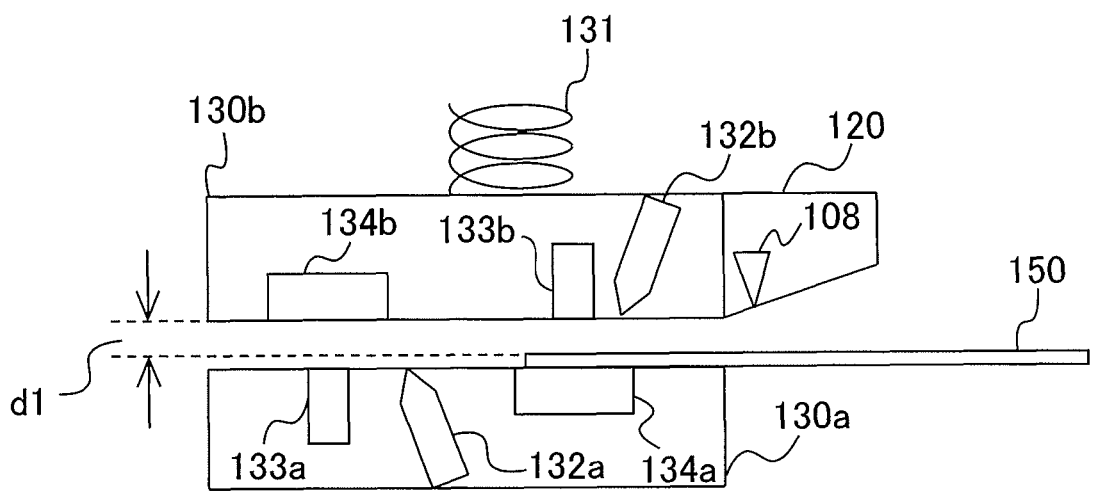
FIG. 13A illustrates a distance between a document back surface and a second image sensor 133b when a document is not a thick medium.
Figure 13B:
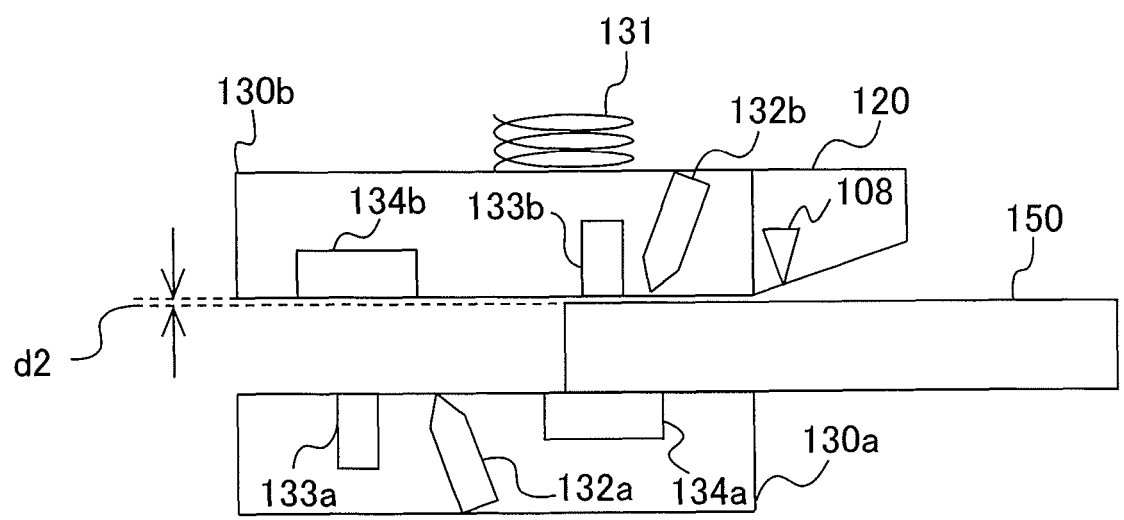
FIG. 13B illustrates a distance between a document back surface and the second image sensor 133b when a document is a thick medium.

When a document is a thick medium, an entire characteristic of an image possibly differs between a front-surface image data and a back-surface image data of the document 150. FIG. 13A and FIG. 13B illustrate a distance between a document back surface and the second image sensor 133b when a document is not a thick medium and when a document is a thick medium.

When a document is not a thick medium, a thickness of the document 150 is smaller than a gap between the second imaging unit 130b at the initial position and the first imaging unit 130, and accordingly, a gap d1 between a back surface of the document 150 and the second imaging unit 130b is relatively large. On the other hand, when a document is a thick medium, the second imaging unit 130b moves, following a thickness of the document 150 rather than by a contact between the imaging unit guide 120 and the document 150. Accordingly, a gap d2 between a back surface of the document 150 and the second imaging unit 130b is relatively small. As a result, when a document is a thick medium, an image data of a back surface of the document 150 tends to have a higher brightness compared with the case in which the document is not a thick medium.

When a document is a thick medium, the shading processing unit 406 corrects a shading correction data for a back surface of a document 150. For example, when a document is a thick medium, the shading processing unit 406 may correct the shading correction data by increasing a brightness of the a shading correction data such that the image data of a back surface of a document 150 is corrected to become darker. At this time, the shading processing unit 406 may determine a correcting amount of the shading correction data in accordance with a white reference level difference DL.

Moreover, when a document is a thick medium, a gap between a back surface of the document 150 and the second imaging unit 130b is narrowed, that makes a focus displaced. When a document is a thick medium, the image processing unit 407 may perform an unsharp mask process on image data of a back surface.

Moreover, the image processing unit 407 performs a predetermined image processing on image data received from the imaging unit 130. For example, the image processing unit 407 performs, as the predetermined image process, a cropping processing of removing a background region in image data to cut out only a document region.

An edge that is a boundary between a background region and a document region is performed by comparing the brightness of each pixel in image data with a threshold to distinguish the document region and the background region having different a brightness. When a document is a thick medium, the brightness of a background region drops compared with the brightness of a background region when a document is a thin medium, and the brightness change at a boundary between a document region and a background region becomes gentle, possibly reducing the accuracy in detecting an edge.

Figure 14A:
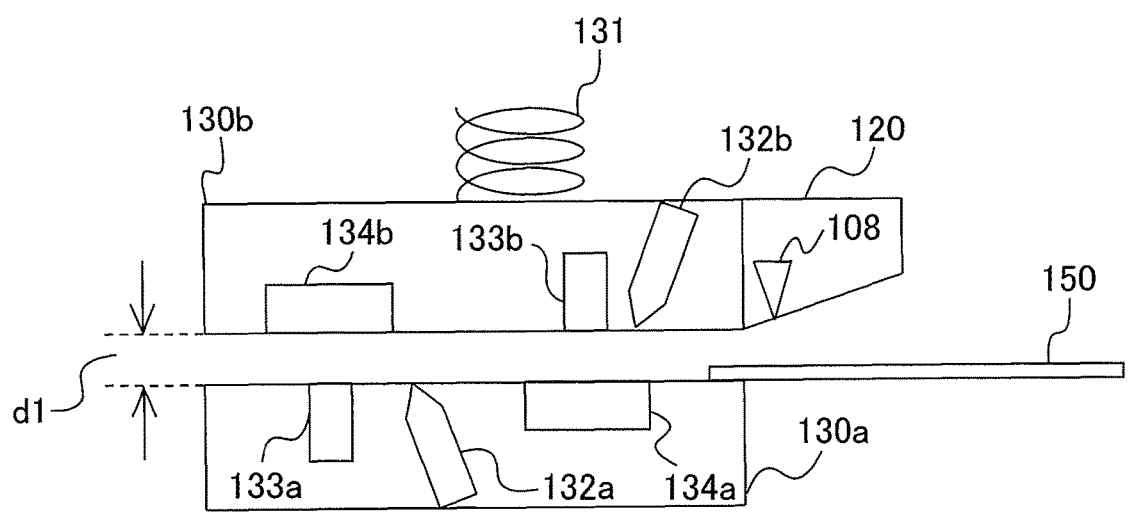
FIG. 14A illustrate a distances between the image sensor 133 and a white reference unit 134 when a document is not a thick medium.
Figure 14B:
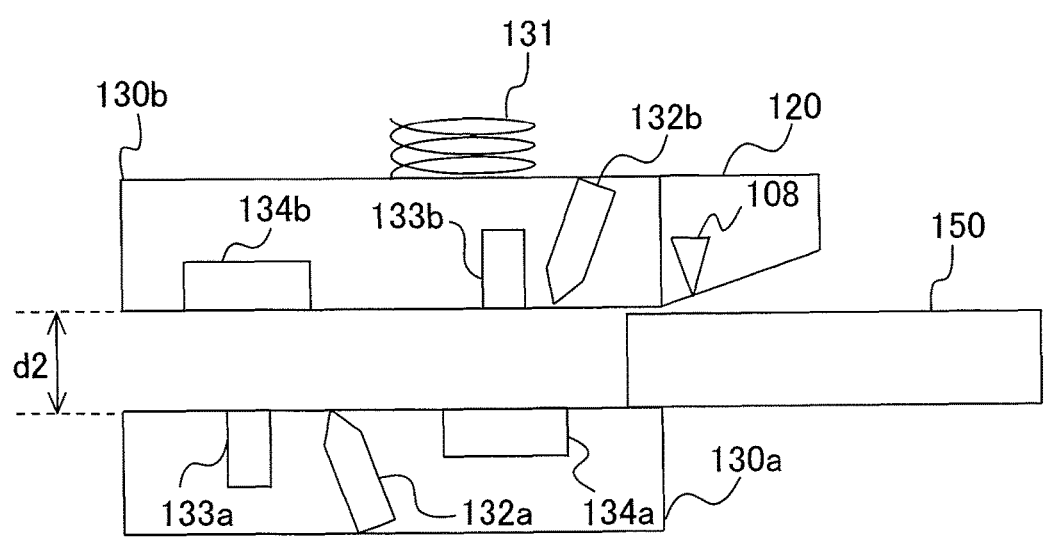
FIG. 14B illustrate a distances between the image sensor 133 and the white reference unit 134 when a document is a thick medium.
Figure 15A:
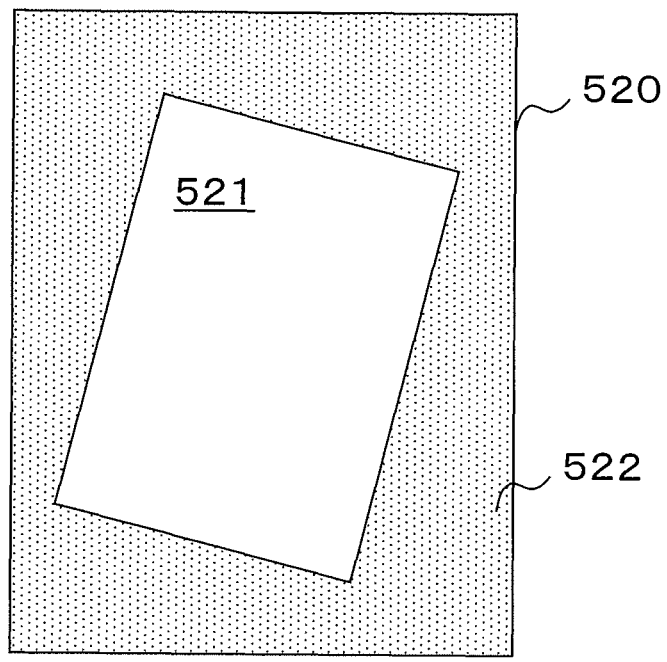
FIG. 15A schematically illustrates image data of a document when a document is not a thick medium.
Figure 15B:
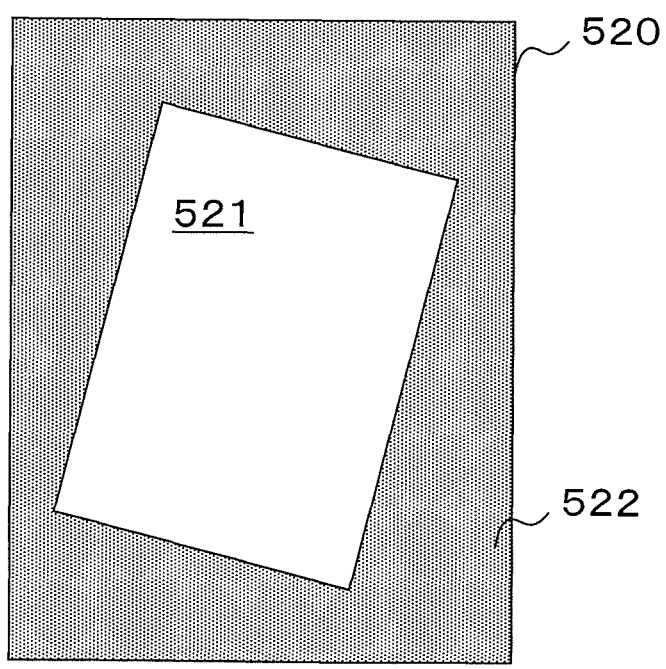
FIG. 15B schematically illustrates image data of a document when a document is a thick medium.

FIG. 14A and FIG. 14B illustrate a distance between the image sensor 133 and the white reference unit 134 when a document is not a thick medium and when a document is a thick medium. FIG. 15A and FIG. 15B schematically illustrate the image data of a document respectively when a document is not a thick medium and when a document is a thick medium. The reference code 520 indicates an image data before a cropping processing, the reference code 521 indicates a document region, and the reference code 522 indicates a background region.

A distance d2 between the image sensor 133 and the white reference unit 134 when a document is a thick medium is larger than a distance d1 between the image sensor 133 and the white reference unit 134 when a document is not a thick medium. For this reason, when a document is a thick medium, the brightness of a background region 522 drops, compared with the brightness of a background region 522 when a document is not a thick medium.

Figure 16A:
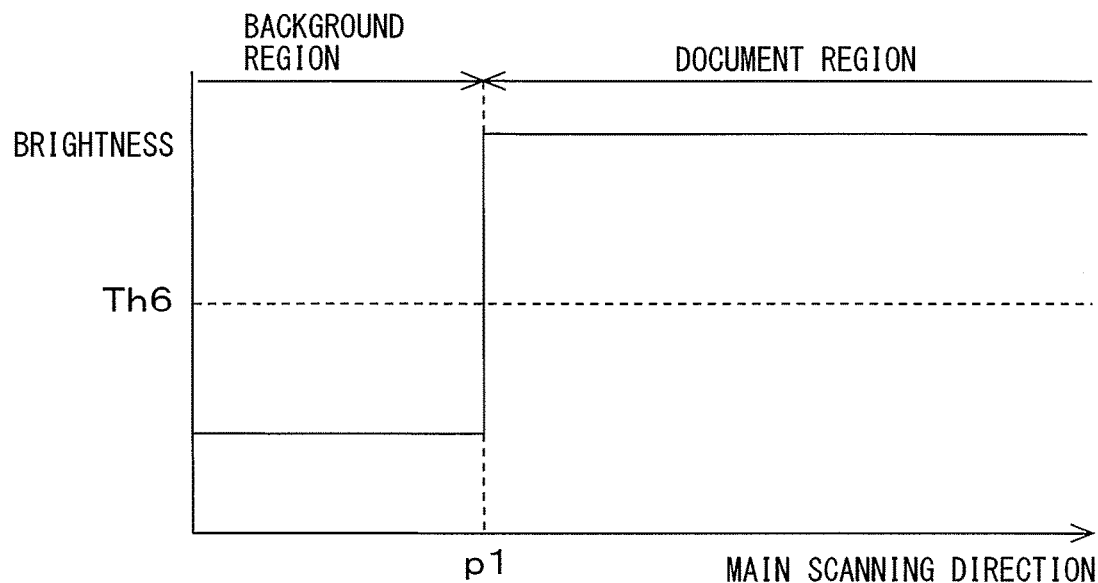
FIG. 16A illustrates a brightness change at an edge when a document is not a thick medium.
Figure 16B:
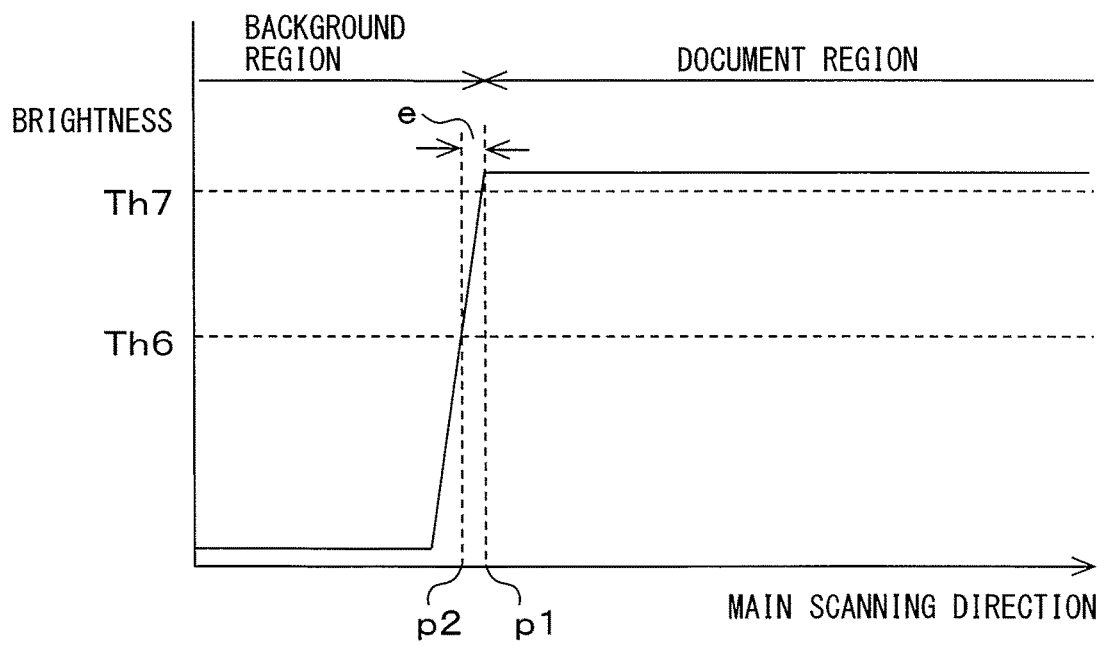
FIG. 16B illustrates a brightness change at an edge when a document is a thick medium.

FIG. 16A and FIG. 16B illustrate the brightness change at the edges respectively when a document is not a thick medium and when a document is a thick medium. The horizontal axis indicates a pixel position in a main scanning direction, and the vertical axis indicates the brightness of each pixel. When a document is a thick medium, a distance between the image sensor 133 and the white reference unit 134 becomes longer, that makes a position of the white reference unit 134 shifted out of the depth of field of the image sensor 133. For this reason, the brightness change at a boundary between a document region and a background region becomes gentle.

As a result, when the same threshold Th6 is used for a document that is not a thick medium and for a document that is a thick medium, the edge position p2 detected for a document that is a thick medium is displaced by an error amount e from the edge position p1 detected for a document that is not a thick medium. For this reason, when a document is a thick medium, the image processing unit 407 corrects a detection threshold used in an edge detection in the cropping processing. For example, when a document is a thick medium, the image processing unit 407 corrects a detection threshold to be a value for detecting an edge at a pixel having a higher brightness.

Reference is made to FIG. 8. The image transmitting unit 408 transmits an image data to the information processing apparatus 10. The notifying unit 409 notifies the information processing apparatus 10 of a result of a document thickness detection performed by the thickness detection unit 404 as a thickness information.

Figure 17:
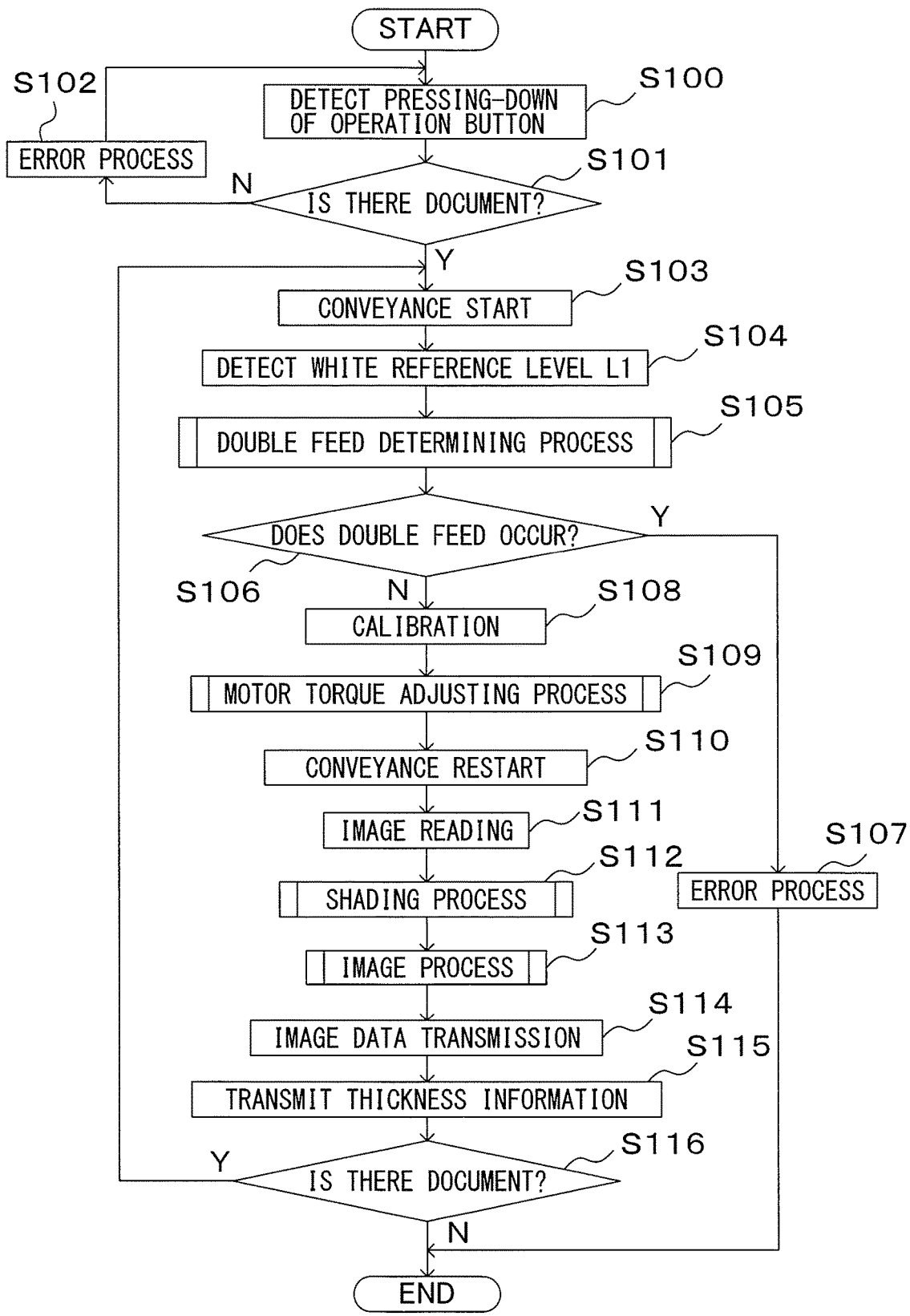
FIG. 17 is a flowchart of an operational example for the entire processing of the image reading apparatus 100.

FIG. 17 is a flowchart of an operational example for the entire processing of the image reading apparatus 100. At the step S100, the image reading apparatus 100 detects that the operation button 106 is pressed down by a user. The step S101 corresponds to the processing of the conveyance control unit 401.

At the step S101, on the basis of a first document detection signal received from the first document detection unit 110, the image reading apparatus 100 determines whether or not a document is placed on the document table 103. The step S102 corresponds to a process of the conveyance control unit 401. When a document is placed (yes at the step S101), the processing proceeds to the step S103. When a document is not placed (no at the step S101), the processing proceeds to the step S102. At the step S102, the image reading apparatus 100 performs a predetermined error process, and then returns the processing to the step S100.

At the step S103, the image reading apparatus 100 drives the motor 314 to rotate the sheet feeding roller 113, the retard roller 114, the first conveyance roller 116, and the second conveyance roller 140, thereby starting a conveyance of a document. The step S103 corresponds to a processing of the conveyance control unit 401. At the step S104, the image reading apparatus 100 detects a first white reference level L1. The step 104 corresponds to a processing of the white reference level detection unit 402.

At the step S105, the image reading apparatus 100 performs a double feed determining process and detection of a thickness of a document, and stops the conveyance of the document. The step S105 corresponds to a processing of the conveyance control unit 401, the white reference level detection unit 402, the double feed determination unit 403, and the thickness detection unit 404.

At the step S106, the image reading apparatus 100 determines whether or not a double feed is occurring. The step S106 corresponds to a processing of the double feed determination unit 403. When a double feed occurs (yes at the step S106), the processing proceeds to the S107. When double feed does not occur (no at the step S106), the processing proceeds to the S108. At the step S107, the image reading apparatus 100 performs a predetermined error processing, and then terminates the processing.

At the step S108, the image reading apparatus 100 performs a calibration for generating a shading correction data. The image reading apparatus 100 detects a second white reference level L2, and generates the shading correction data on the basis of a brightness distribution of the image data of the white reference unit 134. The step S108 corresponds to a processing of the white reference level detection unit 402 and the shading processing unit 406. When a second white reference level L2 was detected for detecting a thickness of a document in the double feed determining process of the step S105, a calibration may be performed on the basis of a brightness distribution of the image data of the white reference unit 134 detected at the step S105.

At the step S109, the image reading apparatus 100 performs a motor torque adjusting process. The step S109 corresponds to a processing of the motor control unit 405. At the step S110, the image reading apparatus 100 restarts a conveyance of a document. The step S110 corresponds to a processing of the conveyance control unit 401.

At the step S111, the image reading apparatus 100 reads the image data output from the imaging unit 130. The step S111 corresponds to a processing of the shading processing unit 406. At the step S112, the image reading apparatus 100 performs a shading processing on the read image. The step S112 corresponds to a processing of the shading processing unit 406.

At the step S113, the image reading apparatus 100 performs a predetermined image processing on the image on which a shading processing is performed. The step S113 corresponds to a processing of the image processing unit 407. At the step S114, the image reading apparatus 100 transmits the image data after the image processing to the information processing apparatus 10. The step S114 corresponds to a processing of the image transmitting unit 408. At the step S115, the image reading apparatus 100 informs a thickness information to the information processing apparatus 10. The step S115 corresponds to a processing of the notifying unit 409.

At the step S116, the image reading apparatus 100 determines whether or not a document is placed on the document table 103. The step S116 corresponds to a processing of the conveyance control unit 401. When a document is placed (yes at the step S116), the processing returns to the step S103. When a document is not placed (no at the step S116), the processing is terminated.

Figure 18:
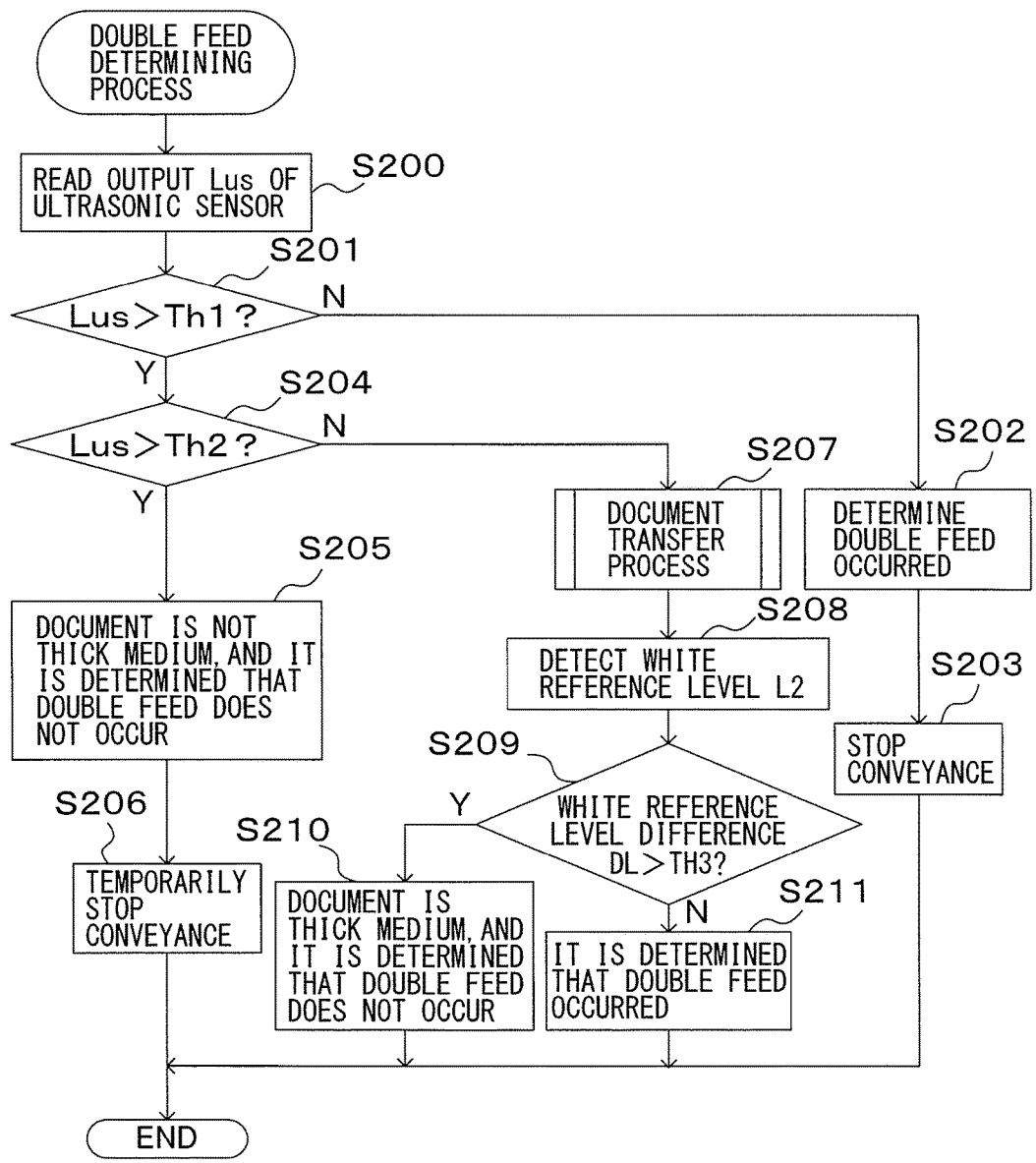
FIG. 18 is a flowchart of an operational example of a double feed determining processing.

FIG. 18 is a flowchart of an operational example of the double feed determining process. At the step S200, the double feed determination unit 403 reads output Lus of the ultrasonic sensor 115. At the step S201, the double feed determination unit 403 determines whether or not the output Lus of the ultrasonic sensor 115 is larger than the threshold Th1. When the output Lus is larger than the threshold Th1 (yes at the step S201), the processing proceeds to the step S204. When the output Lus is equal to or smaller than the threshold Th1 (no at the step S201), the processing proceeds to the step S202.

At the step S202, the double feed determination unit 403 determines that a double feed has occurred. At the step S203, the conveyance control unit 401 stops the conveyance of a document when the second document detection unit 118 detects a leading end of the document. Then, the double feed determining process is terminated.

At the step S204, the double feed determination unit 403 determines whether or not the output Lus of the ultrasonic sensor 115 is larger than the threshold Th2. When the output Lus is larger than the threshold Th2 (yes at the step S204), the processing proceeds to the step S205. When the output Lus is equal to or smaller than the threshold Th2 (no at the step S204), the processing proceeds to the step S207.

At the step S205, the double feed determination unit 403 determines that the document is not a thick medium, and a double feed is not occurring. At the step S206, the conveyance control unit 401 temporarily stops the conveyance of the document when the second document detection unit 118 detects a leading end of the document. Then, the double feed determining process is terminated.

Figure 19A:
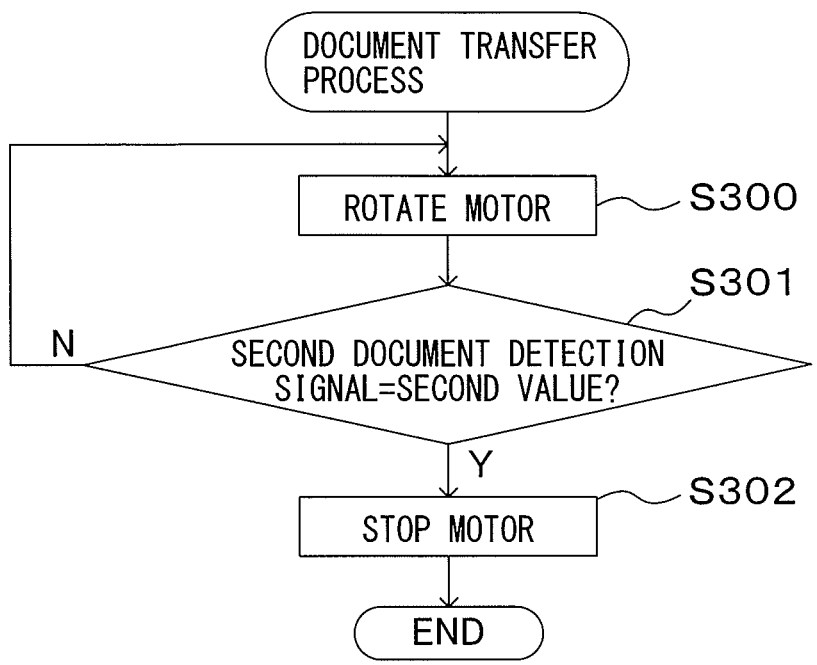
FIG. 19A is a flowchart representing a first example of an operation of a document conveyance processing.
Figure 19B:
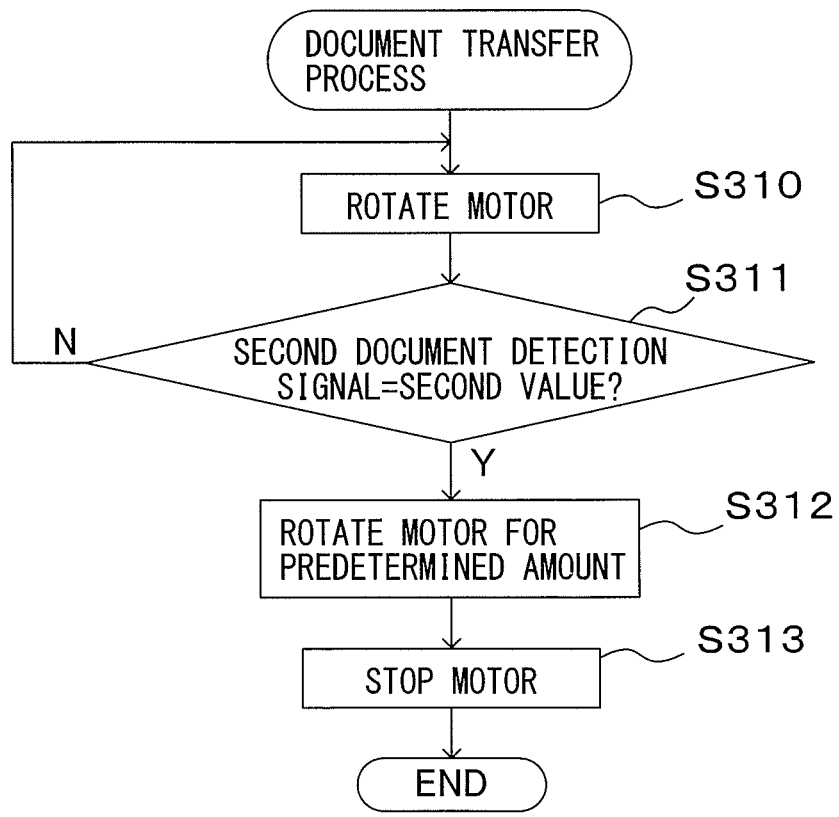
FIG. 19B is a flowchart representing a second example of an operation of the document conveyance processing.

At the step S207, the conveyance control unit 401 performs a document conveyance processing for conveying the document to a position of the imaging unit guide 120. FIG. 19A and FIG. 19B are flowcharts representing a first example and a second example of an operation of the document conveyance processing. The difference between FIG. 19A and FIG. 19B arises from an installed position of the second document detection unit 118.

FIG. 19A is the flowchart when the second imaging unit 130b has moved as much as a thickness of a thick medium when the second document detection unit 118 detects a leading end of the document. FIG. 19B is the flowchart when the second imaging unit 130b has moved as much as a thickness of a thick medium when the document is conveyed by a predetermined movement amount after the second document detection unit 118 detected a leading end of the document.

At the step S300 in FIG. 19A, the conveyance control unit 401 rotates the motor 314 to convey a document. At the step S301, the conveyance control unit 401 determines whether or not a value of a second document detection signal changed from the first value to the second value. When a value of the second document detection signal changed to the second value (yes at the step S301), the processing proceeds to the step S302. When a value of the second document detection signal does not change to the second value (no at the step S301), the processing returns to the step S300. At the step S302, the conveyance control unit 401 stops the motor 314 to stop the conveyance of the document, and terminates the document conveyance processing.

At the step S310 in FIG. 19B, the conveyance control unit 401 rotates the motor 314 to convey a document. At the step S311, the conveyance control unit 401 determines whether or not a value of a second document detection signal changed from the first value to the second value. When a value of the second document detection signal changed to the second value (yes at the step S311), the processing proceeds to the step S312. When a value of the second document detection signal does not change to the second value (no at the step S311), the processing returns to the step S310.

At the step S312, the conveyance control unit 401 rotates the motor by a predetermined rotational amount to conveyance the document by the predetermined movement amount. At the step S313, the conveyance control unit 401 stops the motor 314 to stop a conveyance of the document, and terminates the document conveyance processing.

Reference is made to FIG. 18. At the step S208, the white reference level detection unit 402 detects a second white reference level L2. At the step S209, the thickness detection unit 404 calculates a white reference level difference DL=(L1−L2). The thickness detection unit 404 determines whether or not the white reference level difference DL is larger than the threshold Th3. When the DL is larger than the threshold Th3 (yes at the step S209), the processing proceeds to the step S210. When the DL is equal to or smaller than the threshold Th3 (no at the step S209), the processing proceeds to the step S211.

At the step S210, the thickness detection unit 404 determines that the document is a thick medium. Further, the double feed determination unit 403 determines that a double feed is not occurring, and the conveyance processing is terminated.

Figure 20:
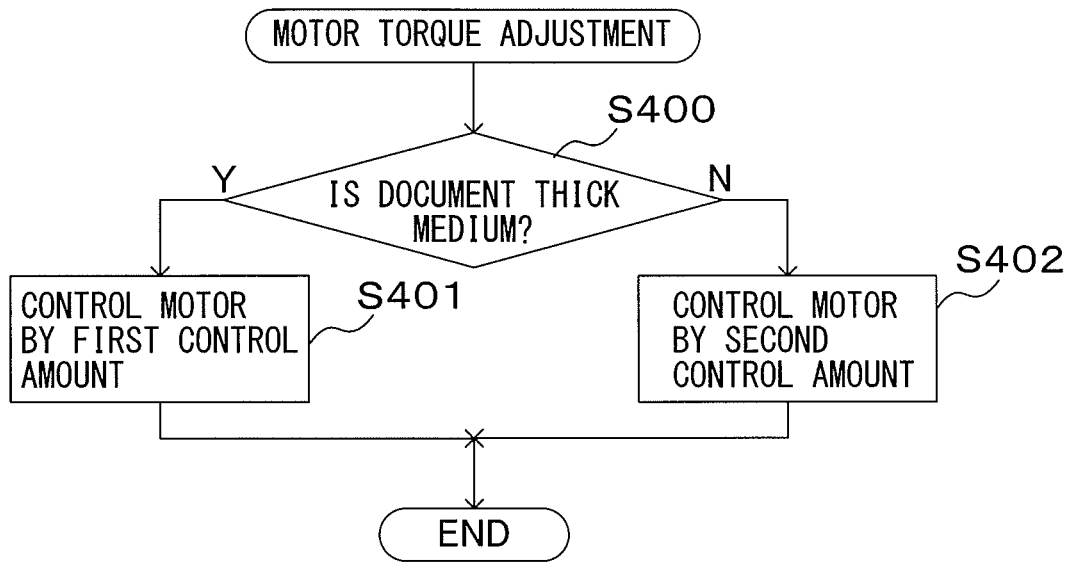
FIG. 20 is a flowchart of an operational example of a motor torque adjusting processing.

FIG. 20 is a flowchart of an operational example of the motor torque adjusting process. At the step S400, the motor control unit 405 determines whether or not the document is a thick medium. When the document is a thick medium (yes at the step S400), the processing proceeds to the step S401.

When the document is not a thick medium (no at the step S400), the processing proceeds to the step S402.

At the step S401, the motor control unit 405 sets a control amount for rotating the motor 314, to be a first control amount that causes the motor 314 to generate relatively large torque. For example, a control amount to be set may be the maximum electric current value applied to the motor 314, or an exciting method. Then, the motor torque adjusting processing is terminated. At the step S402, the motor control unit 405 sets a control amount for rotating the motor 314, to be a second control amount that causes the motor 314 to generate relatively small torque. Then, the motor torque adjusting processing is terminated.

Figure 21:
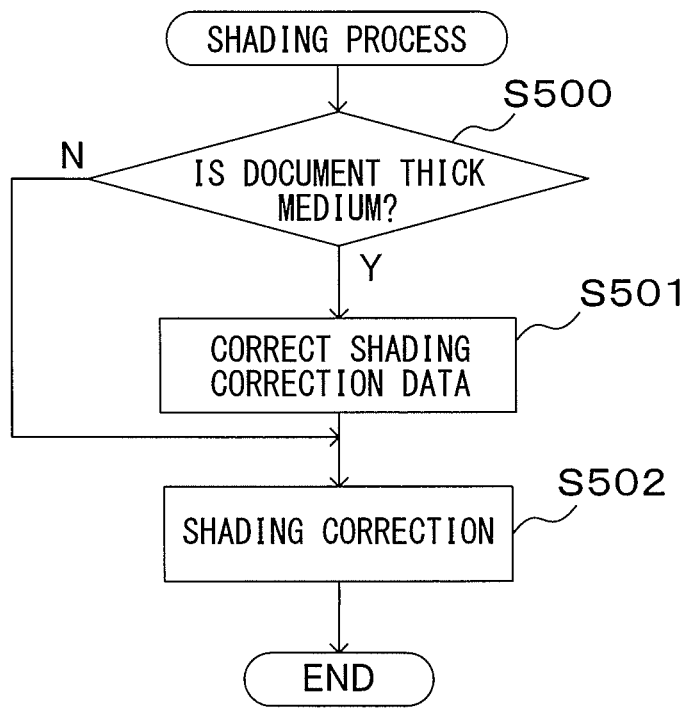
FIG. 21 is a flowchart of an operational example of a shading processing.

FIG. 21 is a flowchart of an operational example of the shading process. At the step S500, the shading processing unit 406 determines whether or not the document is a thick medium. When the document is a thick medium (yes at the step S500), the processing proceeds to the step S501. When the document is not a thick medium (no at the step S500), the processing proceeds to the step S502.

At the step S501, the shading processing unit 406 corrects a shading correction data for a back surface of a document out of the shading correction data generated in the calibration at the step S108. Then, the processing proceeds to the step S502. At the step S502, the shading processing unit 406 performs the shading processing on the image data of the document. Then, the shading processing is terminated.

Figure 22:
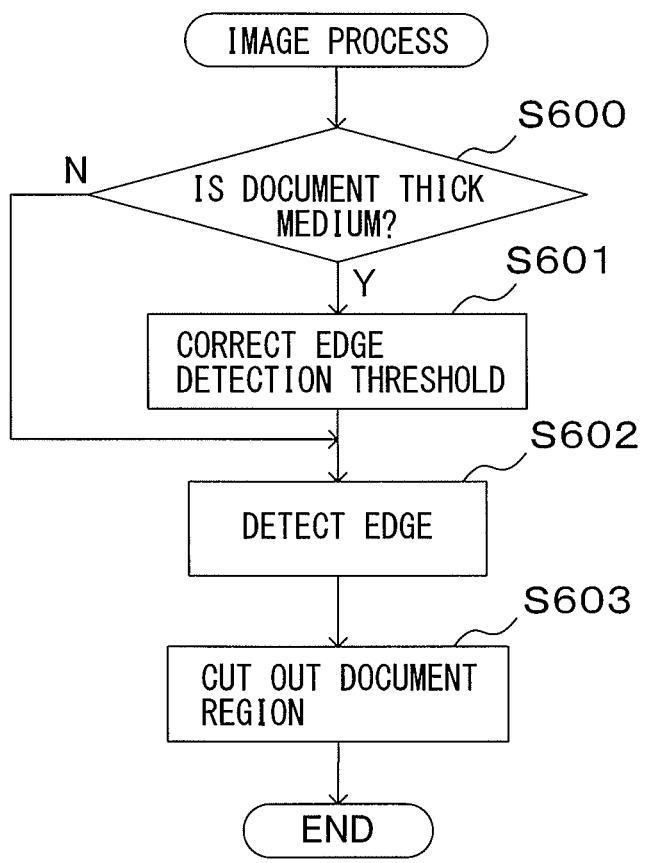
FIG. 22 is a flowchart of an operational example of an image processing.

FIG. 22 is a flowchart of an operational example of the image processing. In this example, the image processing unit 407 performs, as the predetermined image processing, a cropping processing of cutting out a document region from the image data.

At the step S600, the image processing unit 407 determines whether or not the document is a thick medium. When the document is a thick medium (yes at the step S600), the processing proceeds to the step S601. When the document is not a thick medium (no at the step S600), the processing proceeds to the step S602.

At the step S601, the image processing unit 407 corrects an edge detection threshold for detecting an edge at a boundary between a background region and a document region. Then, the processing proceeds to the step S602. At the step S602, the image processing unit 407 performs an edge detection. At the step S603, the image processing unit 407 recognizes the boundary between the background region and the document region by the detected edge, and cuts out the document region from the image data. Then, the image processing is terminated.

Figure 23:
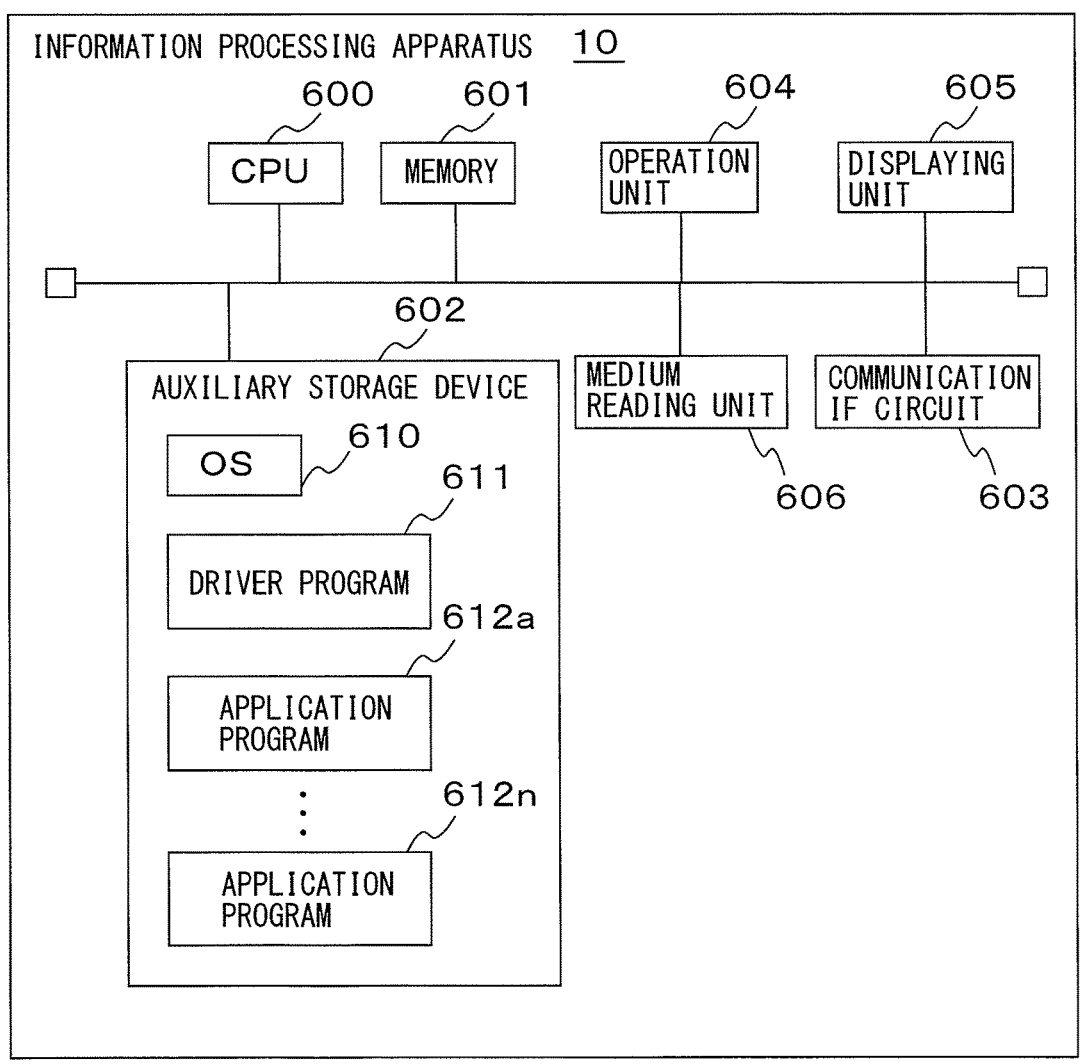
FIG. 23 illustrates one example of a hardware configuration of an information processing apparatus 10.

FIG. 23 illustrates one example of a hardware configuration of the information processing apparatus 10. The information processing apparatus 10 includes a CPU 600, a memory 601, an auxiliary storage device 602, a communication IF circuit 603, an operation unit 604, a displaying unit 605, and a medium reading unit 606.

The auxiliary storage device 602 stores an operating system (OS), a driver program 611, an application programs 612a to 612n that are executed by the CPU 600. The driver program 611 is a computer program for causing the information processing apparatus 10 to control the image reading apparatus 100, and to receive the image data read by the image reading apparatus 100. Moreover, the application programs 612a to 612n are image processing application programs for processing the image data received from the image reading apparatus 100. The auxiliary storage device 602 may include a nonvolatile storage device, a read only memory (ROM), a hard disk, and the like for storing the OS and the programs.

The memory 601 may include a program that is currently executed by the CPU 600, and a volatile memory which stores the data that is temporarily used by this program. The communication IF circuit 603 is an interface for wired and/or wireless communication between the image reading apparatus 100 and the information processing apparatus 10.

The operation unit 604 is an input device that receives an input operation executed by a user. The operation unit 604 may be a keypad, a keyboard, a pointing device, or a touch panel, for example. The displaying unit 605 is a displaying device that visually displays to a user the information that was processed by the information processing apparatus 10. The displaying unit 605 may be a displaying device such as a liquid crystal display, a cathode ray tube (CRT) display, an organic electroluminescence display.

The medium reading unit 606 is an input device that reads the data stored in a computer-readable portable recording medium. For example, the medium reading unit 606 may be a CD-ROM drive device, a DVD-ROM drive device, a flexible disk drive device, a CD-R drive device, a DVD-R drive device, an MO drive device, or a device that can access a flash memory device. The driver program 611 and the application programs 612a to 612n may be, for example, recorded in the above-mentioned portable recording medium, and may be provided to be installed in the auxiliary storage device 602 by a known setup program, or the like.

Moreover, a hardware configuration illustrated in FIG. 23 is merely one example for the explanation of an embodied example. As long as the hardware configuration can perform an operation described in the following, the information processing device 10 may include any of other configurations.

Figure 24:
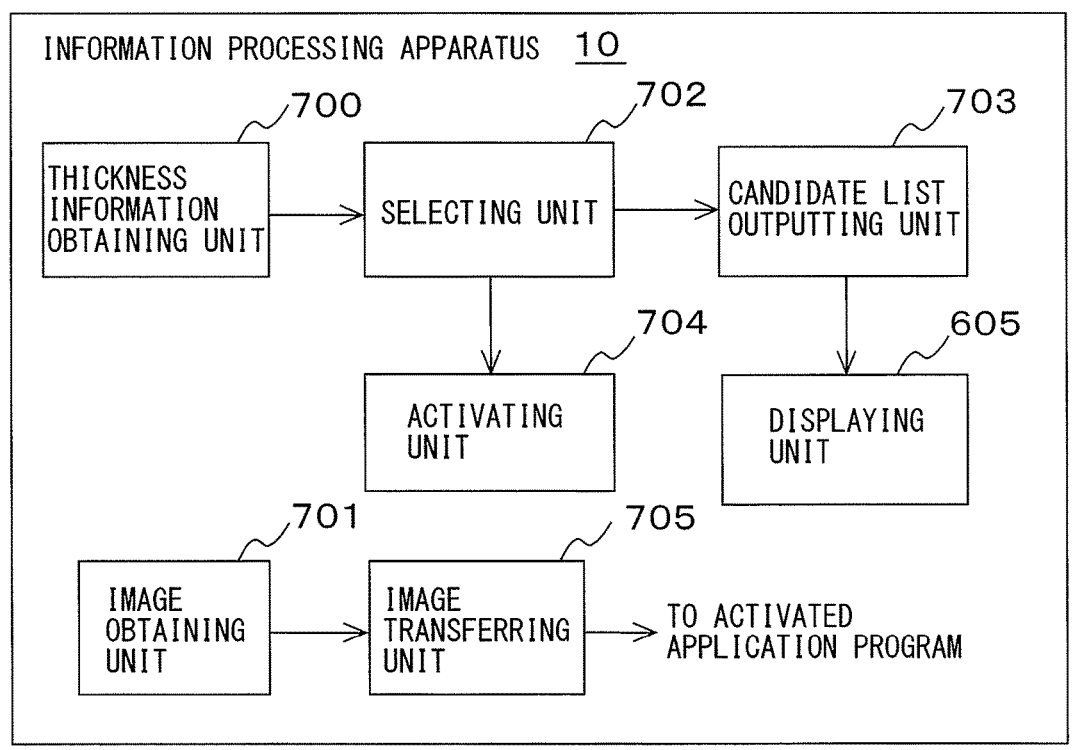
FIG. 24 illustrates one example of a functional configuration of the information processing apparatus 10 executing a driver program 611.

FIG. 24 illustrates one example of a functional configuration of the information processing apparatus 10 that is executing the driver program 611. The information processing apparatus 10 includes a thickness information obtaining unit 700, an image obtaining unit 701, a selecting unit 702, a candidate list outputting unit 703, an activating unit 704, and an image transferring unit 705. Moreover, a functional configuration diagram of FIG. 24 mainly represents a configuration related to processing of the driver program 611 described in the present specification. The information processing apparatus 10 may include configuration elements other than the configuration elements illustrated in the drawing.

The thickness information obtaining unit 700 obtains a thickness information of a document given by the image reading apparatus 100. The image obtaining unit 701 obtains image data of a document transmitted by the image reading apparatus 100.

In accordance with the obtained thickness information, the selecting unit 702 selects, from the application programs 612a to 612n, an image processing application for processing the obtained image data. When a plurality of the application programs are selected, the candidate list outputting unit 703 outputs, to the displaying unit 605, a list of a plurality of the selected application programs as a candidate list of applications for processing the image data.

Figure 25A:
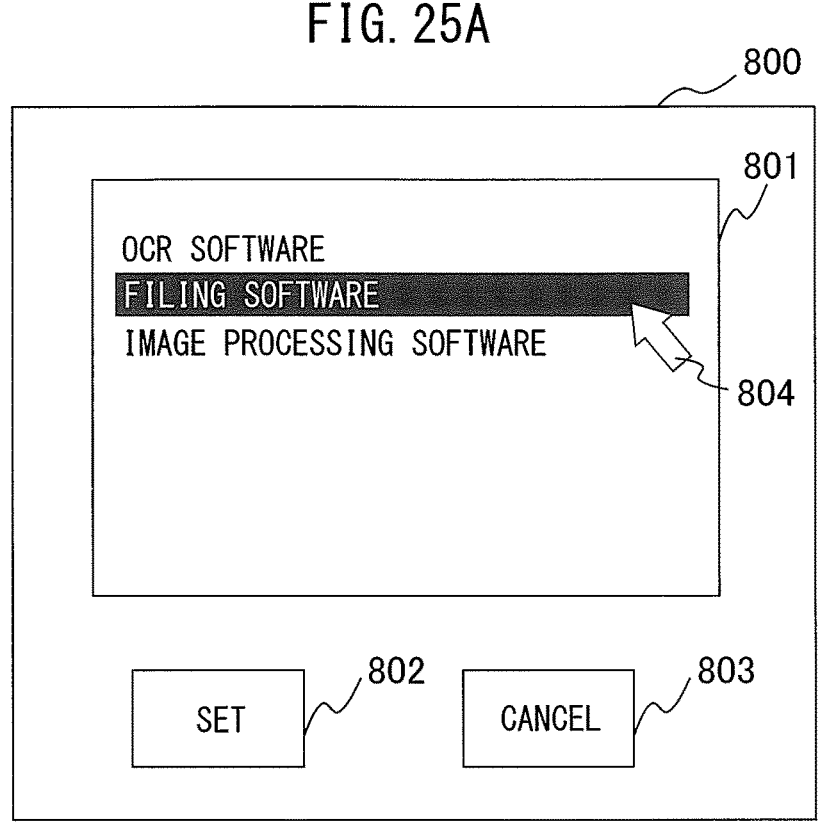
FIG. 25A illustrates a first example of a dialog box that displays a candidate list.

For example, the candidate list outputting unit 703 may output a dialog box that urges a user to activate any of a plurality of the selected application programs. FIG. 25A illustrates a first example of the dialog box that displays the candidate list. The dialog box 800 includes a candidate list 801, a setting button 802, and a cancel button 803. The reference code 804 indicates a cursor that can be moved by the operation of the operation unit 604.

The candidate list 801 of FIG. 25A is displayed when it is informed by the thickness information that the document is not a thick medium. The candidate list 801 includes an optical character reader (OCR) software, a filing software, and an image processing software are image application programs for processing an image data of a document that is not a thick medium.

Figure 25B:
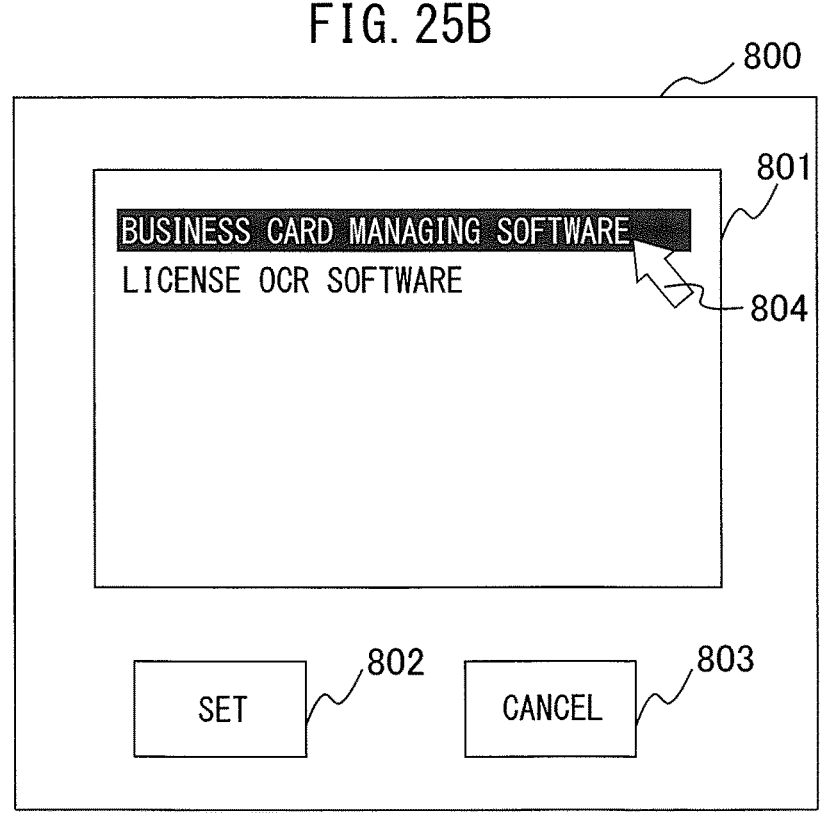
FIG. 25B illustrates a second example of the dialog box that displays a candidate list.

FIG. 25B illustrates a second example of the dialog box that displays the candidate list. The candidate list 801 of FIG. 25B is displayed when it is informed by the thickness information that the document is a thick medium. The candidate list 801 includes a business card managing software and a license OCR software are image application programs for processing an image data of a document that is a thick medium.

After a user selects the desired application in the candidate list 801 by the cursor 804, a user performs an operation of the operation unit 604 corresponding to pressing-down of the setting button 802 to select the image processing application to be activated for processing an image data.

Reference is made to FIG. 24. When the number of the application programs selected by the selecting unit 702 is one, the activating unit 704 activates the application program selected by the selecting unit 702. When the number of the application program selected by the selecting unit 702 is plural, the activating unit 704 activates the application program that is selected by a user from the candidate list output from the candidate list outputting unit 703. The image transferring unit 705 transfers the image data obtained by the image obtaining unit 701 to the image processing application program activated by the activating unit 704.

Figure 26:
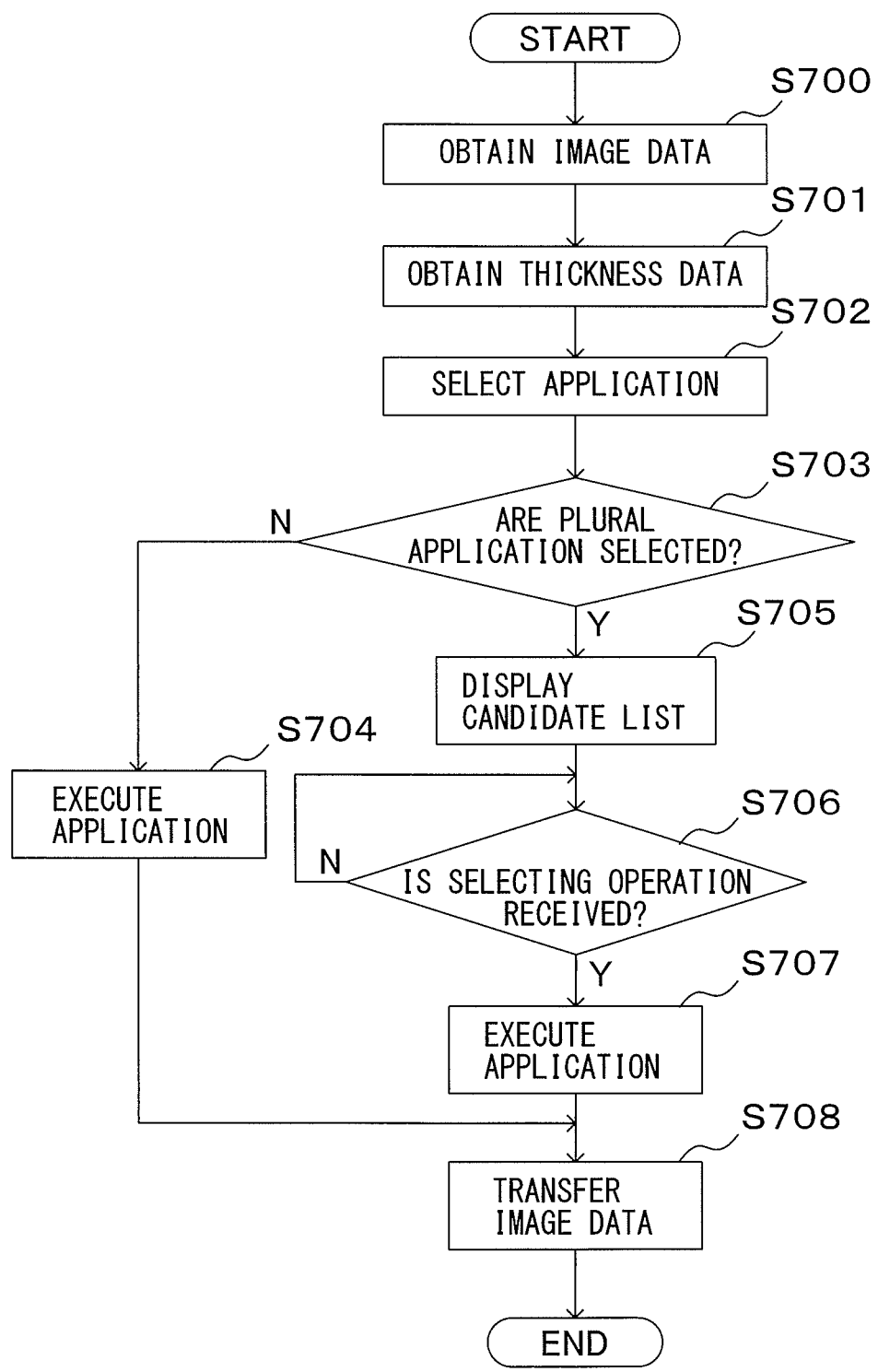
FIG. 26 is a flowchart of a processing example of the driver program.

FIG. 26 is a flowchart of a processing example of the driver program. At the step S700, the image obtaining unit 701 obtains the image data of a document transmitted from the image reading unit 100. At the step S701, the thickness information obtaining unit 700 obtains a thickness information of a document given by the image reading unit 100.

At the step S702, the selecting unit 702 selects either one of the application programs 612*a* to 612*n* in accordance with the thickness information. When the selecting unit 702 selects a plurality of the application programs (yes at the step S703), the processing proceeds to the step S705. When the selecting unit 702 selects one of the application programs (no at the step S703), the processing proceeds to the step S704. At the step S704, the activating unit 704 activates the application program selected by the selecting unit 702. Then, the processing proceeds to the step S708.

At the step S705, the candidate list outputting unit 703 outputs, as a candidate list, a list of a plurality of the selected application programs to the displaying unit 605. At the step S706, the activating unit 704 determines whether or not the operation unit 604 received a selecting operation made by a user for selecting either one of the programs in the candidate list. When the selecting operation was received (yes at the step S706), the processing proceeds to the step S707. When the selecting operation is not received (no at the step S706), the processing returns to the step S706.

At the step S707, the activating unit 704 activates the application program selected at the step 706. At the step S708, the image transferring unit 705 transfers the image data obtained by the image obtaining unit 701, to the image processing application activated by the activating unit 704.

According to the present embodied example, in the image reading apparatus 100, a thickness information of a document being conveyed can be obtained. Obtaining the thickness information facilitates distinguishing between a conveyance of a thick document and a double feed of thin documents in the double feed determination for a document.

According to the present embodied example, by changing a generating torque of the motor that provides a driving force for conveying a document in accordance with a thickness of a document, it is possible to suppress step-out of the motor at the time of conveying a document of a thick document.

Moreover, according to the present embodied example, an image data of one surface of a both-sided document is processed in accordance with a thickness of a document. Thereby, it becomes possible to reduce a difference in an entire characteristic between the image data of a front surface and the image data of a back surface, which difference is generated when a document is a thick medium.

According to the present embodied example, in the cropping process of removing a background region in the image data to cut out a document region, an edge detection threshold is corrected in accordance with a thickness of a document. Thereby, the degradation of the edge detecting accuracy which occurs when a document is a thick document is suppressed.

According to the present embodied example, in the information processing apparatus 10 that receives an image data, an image processing application program for processing image data, or candidates thereof is automatically selected. Thereby, it is possible to simplify an operation of selecting an application program by a user.

Moreover, according to the present embodied example, the second document detection unit 118 is provided such that at an upstream position of an image capturing position of the image sensor 133, the second document detection unit 118 detects a leading end of a document. Moreover, when the second document detection unit 118 detects a leading end of a document, a conveyance of the document is stopped to detect a second white reference level L2 used for detecting a thickness of the document. For this reason, the document is stopped at an appropriate position where an image capturing of the white reference unit 134 by the image sensor 133 is not interfered. As a result, the accuracy in detection of a thickness of a document using a second white reference level L2 improved.

According to the present embodied example, a thickness of a document is detected on the basis of a fluctuation of a second white reference level L2 due to a movement of the second imaging unit 130*b*. For this reason, after the second imaging unit 130*b* is moved by a movement amount in accordance with a thickness of a document that is a thick medium, a second white reference level L2 is detected. For this purpose, a second document detection unit 118 detects a leading end of a document when the second imaging unit 130*b* is moved by a movement amount in accordance with a thickness of the document that is a thick document. The second document detection unit 118 can detect that the second imaging unit 130*b* has been moved by a movement amount depending on a thickness of the document that is a thick document. Thereby, it is possible to obtain a white reference level L2 having an intensity in accordance with a medium thickness, so that a detection accuracy of a document thickness can be improved.

According to a modified example of the present embodied example, the second document detection unit 118 detects a leading end of a document before the second imaging unit 130*b* is moved by a movement amount in accordance with a thickness of the document that is a thick document. Then, the document is conveyed by a predetermined conveyance amount so that the second imaging unit 130*b* is moved by the movement amount in accordance with the thickness of the document that is a thick document. As a result, it is possible to set a delayed time until a white reference level L2 is appropriately detected after a leading end of a document is detected. Accordingly, for example, during the delayed time, by completing the preparation for the detection of a second white reference level L2, a throughput of a conveyance can be improved.

According to the embodiments illustrated herein, it is possible to realize a configuration in which a difference in a thickness of a medium in the process of transfer changes an image signal output from the imaging apparatus provided at the medium conveyance apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveyance apparatus comprising:
   a first unit fixed on one side of a conveyance path of a sheet-shaped medium;
   a second unit provided on the other side of the conveyance path and facing the first unit;
   a guide unit provided at the second unit and contacting the medium inserted into a gap between the first unit and the second unit to move the second unit in a direction away from the conveyance path;
   an imaging unit provided at one of the first unit and the second unit;
   a reference plate, an image of which can be captured by the imaging unit, and provided at the other one of the first unit and the second unit;
   a detecting unit for detecting the medium conveyed in the conveyance path, and provided in the conveyance path at an upstream position of a reading position where the imaging unit reads the medium, with respect to the conveyance path; and
   a processor for processing an image of the medium captured by the imaging unit, based on an image of the reference plate that has been captured, before the detecting unit detects a leading edge of the medium, and an image of the reference plate when the detecting unit detects the leading edge of the medium.

2. The medium conveyance apparatus according to claim 1, further comprising a determining unit for determining whether or not the medium is positioned in a gap between the first unit and the second unit, in accordance with an output signal of the detecting unit.

3. A medium conveyance apparatus comprising:
   a first unit fixed on one side of a conveyance path of a sheet-shaped medium;
   a second unit provided on the other side of the conveyance path and facing the first unit;
   a guide unit provided at the second unit and contacting the medium inserted into a gap between the first unit and the second unit to move the second unit in a direction away from the conveyance path;
   an imaging unit provided at one of the first unit and the second unit;
   a reference plate, an image of which can be captured by the imaging unit, and provided at the other one of the first unit and the second unit; and
   a detecting unit for detecting the medium conveyed in the conveyance path, and provided in the conveyance path at an upstream position of a reading position where the imaging unit reads the medium, with respect to the conveyance path, wherein
   the guide unit includes a path surface in a first plane parallel to a second plane of a surface of the second unit facing the first unit and the conveyance path, wherein
   the detecting unit is provided at an upstream edge of the path surface of the guide unit with respect to the conveyance path so that the detecting unit detects the medium before the medium reaches the path surface of the guide unit, and wherein detecting unit detects a leading end of the medium and causes the imaging unit to capture the image of the reference plate responsive to said detection of the leading end, and
   wherein the guide unit includes a hole in the first plane where a detection portion of the detecting unit is inserted therein for detecting the medium conveyed in the conveyance path.

4. The medium conveyance apparatus according to claim 3, further comprising a determining unit for determining whether or not the medium is positioned in a gap between the first unit and the second unit, in accordance with an output signal of the detecting unit.

* * * * *